United States Patent [19]
Akamatsu et al.

[11] Patent Number: 5,752,101
[45] Date of Patent: May 12, 1998

[54] FLASH LIGHT AMOUNT CONTROLLING APPARATUS

[75] Inventors: Norihiko Akamatsu, Suita; Masataka Hamada, Osakasayama; Kazuhiko Yukawa, Wakayama; Hiroshi Ootsuka, Sakai, all of Japan

[73] Assignee: Minolta Co., Ltd., Osaka, Japan

[21] Appl. No.: 285,963

[22] Filed: Aug. 4, 1994

[30] Foreign Application Priority Data

Aug. 5, 1993 [JP] Japan .................................. 5-214897

[51] Int. Cl.⁶ .................................................. G03B 13/36
[52] U.S. Cl. ........................... 396/155; 396/106; 396/159
[58] Field of Search ..................................... 354/402, 413

[56] References Cited

U.S. PATENT DOCUMENTS

| | | | |
|---|---|---|---|
| 4,371,240 | 2/1983 | Shimizu et al. | 352/400 |
| 4,429,966 | 2/1984 | Hosoe et al. | 354/406 |
| 4,494,850 | 1/1985 | Katsuma et al. | 354/416 |
| 4,575,210 | 3/1986 | Yamada et al. | 354/400 |
| 4,693,582 | 9/1987 | Kawamura et al. | 354/403 |
| 4,697,908 | 10/1987 | Ogihara | 354/439 |
| 4,791,446 | 12/1988 | Ishida et al. | 354/408 |
| 4,821,058 | 4/1989 | Minnick et al. | 352/400 |
| 4,974,005 | 11/1990 | Izumi et al. | 354/400 |
| 5,038,165 | 8/1991 | Amanuma et al. | 354/402 |
| 5,231,447 | 7/1993 | Takagi | 354/415 |
| 5,289,225 | 2/1994 | Hirai | 354/402 |
| 5,315,539 | 5/1994 | Hamada et al. | 354/400 |
| 5,367,353 | 11/1994 | Amanuma et al. | 354/409 |
| 5,379,088 | 1/1995 | Ueda et al. | 354/402 |

Primary Examiner—Daniel P. Malley
Attorney, Agent, or Firm—Sidley & Austin

[57] ABSTRACT

In a flash light amount control device capable of operating according to multiple methods, the flash light control method alternates according to the detected AF mode setting, the camera panning status, or the reliability of the detected object distance. For example, if AF lock is on, control is performed by flash light adjustment, but if AF lock is not on, control is performed by flashmatic. If panning is performed after AF lock, the method of control alternates between flash light adjustment and flashmatic in response to the amount of panning movement.

7 Claims, 19 Drawing Sheets

FLASH LIGHT AMOUNT CONTROLLING APPARATUS

BACKGROUND OF THE INVENTION

1. Field of the Invention

This invention relates to a flash light amount controlling apparatus which controls to an appropriate level the amount of light emitted by an electronic flash toward the main object to be photographed.

2. Description of the Prior Art

Conventionally, cameras having an automatic focus detection (hereinafter referred to as autofocus, or AF) function, and further having the ability to perform automatic exposure while automatically controlling the amount of light emitted from the electronic flash, have been provided. FIG. 25 shows a basic outline of the construction of the optical system of a single lens reflex camera comprising one example of this type of camera. In this camera, when focus detection is performed, the beam of light of the object to be photographed that passes through photo-taking lens 2 is, after it passes through a transparent member of main mirror 12, reflected toward the bottom of camera body B by sub-mirror 14, whereupon it is led to focus detection module 18. On the other hand, when exposure is performed via shutter release operation, main mirror 12 and sub-mirror 14 are pushed together toward the top of camera body B, and the beam of light that passes through photo-taking lens 2 forms an image on film surface F0. At this point, the light reflected from the film surface is led to element 36 of the flash light amount controlling apparatus as the beam of light used for the control of the flash light amount.

The principle of performing focus detection based on the beam of light reflected toward the bottom of camera body B is the TTL phase differential method. FIG. 26 is a type view of a optical system for performing focus detection using the phase differential method. Condenser lens 4 is located in the vicinity of intended image forming plane FS of photo-taking lens 2. This intended image forming plane FS is located in a position equivalent to film surface F0 (FIG. 25). A pair of re-imaging lenses 6 and 8 are located symmetrically with respect to optical axis AX of photo-taking lens 2 at the rear portion of intended image forming plane FS. The image formed on intended image forming plane FS via photo-taking lens 2 is re-formed by this pair of re-imaging lenses 6 and 8. A0, B0 and C0 indicate front-focus, in-focus and rear-focus images, respectively, formed by photo-taking lens 2. Image re-formation lenses 6 and 8 form first and second images A1 and A2, B1 and B2 and C1 and C2, corresponding to front-focus image A0, in-focus image B0 and rear-focus image C0, respectively.

Where front-focus image A0, in-focus image B0 and rear-focus image C0 are formed as images indicated by upward-pointing arrows, the first and second images corresponding to them are formed as images indicated by downward-pointing arrows, and the space between the first image and second image varies in accordance with the focus adjustment status of photo-taking lens 2. Therefore, if, with regard to re-imaging lenses 6 and 8, photoreceptor element arrays are located either at a conjugate position with respect to intended image forming plane FS or in the vicinity thereof, and if the positions of the first image and second image are determined from the output of these photoreceptor element arrays, the focus adjustment status of photo-taking lens 2 may be detected. Incidentally, aperture masks 10-1 and 10-2 are located in front of re-imaging lenses 6 and 8. In this way, the defocus amount may be detected via the space between the first image and second image based on the output from the photoreceptor element arrays.

Incidentally, in FIG. 25, L is an exchangeable lens, 12a is a transparent member of main mirror 12, 10 is an aperture mask, 16 is a mirror box, 16a is an aperture that conveys light to the AF module, 18a is a basket body that fixes and holds all parts of the AF module, 20 is a photoreceptor element package, 22 is a viewfinder mask, 24 is an optical path refracting mirror, 26 is an infrared cut filter, 28 is a Fresnel lens, 35 is a condenser lens, 30 is a pentagonal roof prism, 32 is an eyepiece, 33 is an optical path refracting lens, and 34 is a light measurement element.

FIG. 27 is a type view of the case in which the lengths of all optical paths in the optical system in FIG. 26 are extended. Where the optical path lengths are extended, front-focus image A0 and rear-focus image C0 are re-formed by re-imaging lenses 6 and 8 under the same conditions of the photo-taking lens, and images A1 and A2 and B1 and B2 are formed. When this happens, the distances between images A1 and A2, B1 and B2 and C1 and C2 on the photoreceptor element are wider than in FIG. 26. In other words, the discrepancy in the positions of the re-formed images on the photoreceptor surface vis-a-vis the discrepancy in the same defocus amount becomes larger. Therefore, a small defocus amount discrepancy may be detected by the photoreceptor element, and the accuracy of focus detection may be increased.

However, in the construction shown in FIG. 25, the optical path length of focus detection module 18 is limited by the part housing flash light amount controlling element 36, which limits the accuracy of focus detection. Therefore, there are models in which either the AF photoelectric conversion element or the light amount monitoring element may serve as the flash light amount controlling element, which improves space efficiency, lowers the cost, and improves autofocus performance, but limits the control area for autofocusing and for flash light adjustment. In other words, where the main object to be photographed is within the control area, if flash light adjustment is performed using the element for that area, flash light adjustment appropriate for the main object to be photographed may be performed, but where the main object to be photographed leaves the control area, for example during panning, control of the flash light amount can no longer be performed properly.

Incidentally, it is known that in order to obtain a proper exposure of the main object to be photographed with a camera having an autofocus function, the photo-taking screen is divided into multiple areas, for each of which light measurement and focus detection are performed, and flash light adjustment is carried out, with an emphasis on the area containing the main object to be photographed, based on the measurement information obtained from the multiple areas.

In addition, in a camera with various AF modes (continuous AF, AF lock), because the focus detection information becomes inaccurate if the camera shake occurs, a method by which to change the AF mode to an appropriate setting based on a determination that the camera is shaking is known (for example, see Japanese Patent Laid-Open Application No. 3-161722).

Furthermore, in a camera in which AF lock is performed at the time of focusing, and in which the exposure amount setting to control exposure is simultaneously locked (AE lock), the AE lock is released in order to obtain an appropriate exposure, even where the object to be photographed is a moving object (e.g., Japanese Patent Laid-Open Application No. 1-288818).

However, in none of the above devices is it concretely shown how control of flash light adjustment is performed when the object to be photographed leaves the autofocusing and flash light adjustment control areas.

In addition, in U.S. Pat. No. 4,429,966, in a contrast detection type AF camera, a single member serves as an AF sensor and as a photoreceptor element for flash light adjustment, and light adjustment of the flash light is performed using an AF sensor array.

Moreover, in U.S. Pat. No. 4,791,446, fixed light measurement is performed using an AF sensor integral time control monitoring element, but this monitoring element is not used to perform flash light adjustment. The AF sensor and the monitoring element are on the same chip, and there is no photoreceptor element located elsewhere other than on this chip.

Furthermore, in U.S. Pat. No. 4,974,005, both AF lock and AE lock are provided; when AF lock is on, AE lock is activated as well, and if it is subsequently determined that the object to be photographed is a moving object, AE lock is released. However, there is no disclosure regarding flash light adjustment.

In addition, in U.S. Pat. No. 4,494,850, control of the flash light amount alternates between flashmatic (FM) and flash light adjustment in accordance with the focal length of the photo-taking lens. However, it does not alternate between FM and flash light adjustment in accordance with the AF mode. Moreover, where the object distance is unreliable, it alternates between FM and flash light adjustment.

Furthermore, the camera in U.S. Pat. No. 5,231,447 changes the priority of multiple flash light adjustment areas depending on whether the AF mode is continuous AF or single AF. However, switching of the flash light amount control method does not occur in accordance with the AF mode. Moreover, there is no disclosure that the flash light adjustment area changes when panning is occurring.

SUMMARY OF THE INVENTION

The present invention takes the above problems into account, and its object is to provide a flash light amount controlling apparatus that can properly control the amount of light emitted by an electronic flash, even where the object to be photographed is out of the control area because the photo-taker is performing panning, etc., by alternating the method of controlling the flash light amount in accordance with the set AF mode.

Another object of the present invention is to provide a flash light amount controlling apparatus in which the appropriate beams of light are led to the photoreceptor areas for focus detection and light amount control, respectively.

Yet another object of the present invention is to provide a flash light amount controlling apparatus in which, through the use of a photoreceptor element for focus detection and control of the amount of light reaching the light-receiving area, space may be more efficiently utilized and the size of the sensor chip may be minimized, and in which costs may be reduced by having the photoreceptor element serve as a monitoring photoreceptor element.

Yet another object of the present invention is to provide a flash light amount controlling apparatus in which the construction of the optical system inside the AF module may be simplified.

Yet another object of the present invention is to provide a flash light amount controlling apparatus in which the amount of light emitted from an electronic flash may be properly controlled by varying the flash light amount control method in accordance with the AF mode.

Yet another object of the present invention is to provide a flash light amount controlling apparatus in which the amount of light emitted from an electronic flash may be properly controlled even where camera panning is being performed.

Yet another object of the present invention is to provide a flash light amount controlling apparatus in which flash light amount control may be performed correctly in accordance with the reliability of the object distance.

In order to achieve the above objects, the flash light amount controlling apparatus of this invention has a mechanism that receives the light from a prescribed area of the object to be photographed and detects the focal status of the photo-taking lens as well as a controlling apparatus that receives the light from a prescribed area of the object to be photographed and controls the amount of light emitted from the electronic flash so as to allow correct exposure, wherein the area that receives the light used for control is located outside the area used for focus detection.

Furthermore, another construction of the present invention has a mechanism that receives the light from a prescribed area of the object to be photographed and detects the focal status of the photo-taking lens as well as a controlling apparatus that receives the light from a prescribed area of the object to be photographed and controls the amount of light emitted from the electronic flash so as to allow correct exposure, wherein the area which receives the light used for control is located within the area used for focus detection.

Furthermore, yet another construction of the present invention comprises an AF module comprising an IC chip on which is formed a first sensor used in the autofocus process as well as a member that leads the beam of light to be received to said IC chip, a processing circuit that performs prescribed processing based on the output from said first sensor, a lens drive mechanism that drives the lens based on the results of the processing performed by said processing circuit, a second sensor formed on the member that is formed on said AF module member that leads the beam of light, an electronic flash, and a flash light amount controlling circuit belonging to the above flash light amount controlling apparatus that controls the amount of light emitted by the electronic flash based on the output from the above second sensor.

Furthermore, yet another construction of the present invention comprises a flash light amount controlling apparatus that controls the amount of light emitted by the electronic flash in accordance with the autofocus mode, comprising a determination device that determines the autofocus mode setting and a control device that selects a first or second control device in accordance with the mode setting determined by said determination device and controls the amount of light emitted by the electronic flash.

Furthermore, yet another construction of the present invention comprises a flash light amount controlling apparatus that controls the amount of light emitted by the electronic flash in accordance with whether the camera is shaking, comprising a camera shake detection device that detects the camera shake status (i.e., whether the camera is shaking) and a control device that controls the amount of light emitted by the electronic flash in accordance with the camera shake status detected by said camera shake detection device.

Furthermore, yet another construction of the present invention comprises a flash light amount controlling apparatus that controls the amount of light emitted by the electronic flash in accordance with the object distance, comprising a focus detection device that detects the focusing condition of the object to be photographed, a detection device that detects whether or not the distance information concerning the object to be photographed obtained by said focus detection device is reliable, and a control device that controls the amount of light emitted by the electronic flash in accordance with the range of error when it is determined by said detection device that the distance information is not reliable.

BRIEF DESCRIPTION OF THE DRAWINGS

These and other objects and features of this invention will become clear from the following description, taken in conjunction with the preferred embodiments with reference to the accompanied drawings in which.

DETAILED DESCRIPTION OF THE PREFERRED EMBODIMENTS

Figure 1:
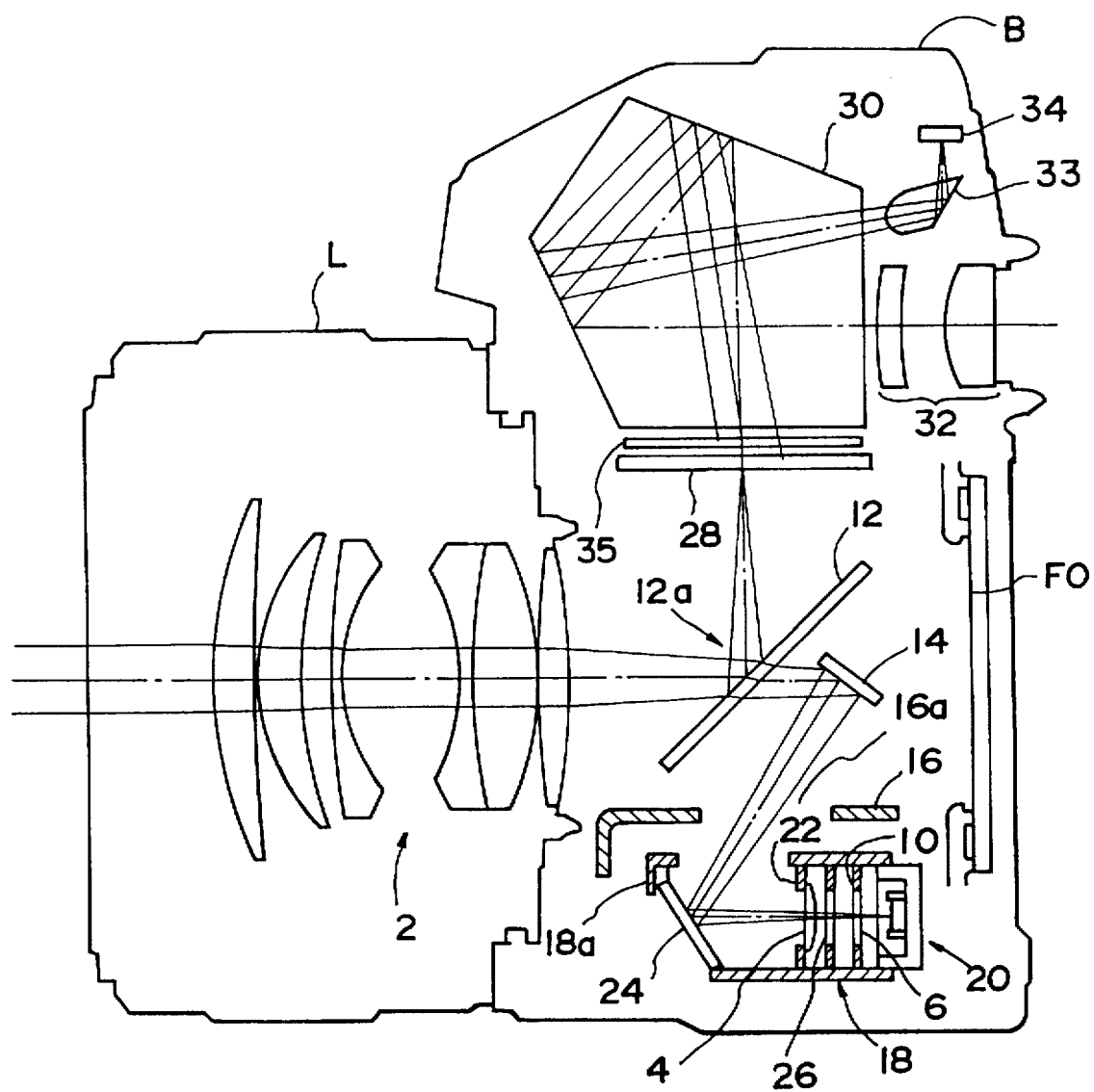
FIG. 1 is an outline construction diagram of a camera equipped with a flash light amount control device contained in one embodiment of the present invention.

One embodiment of the present invention will be explained with reference to the drawings. FIG. 1 shows a sectional view of the overall optical systems of a single lens reflex camera in which this embodiment is used, and shows in particular the optical path and the placement of the light measurement/focus detection device for performing focus detection and flash light amount control. The construction and placement of the motor, etc., is omitted from the drawing. In FIG. 1, B is the camera body and L is an exchangeable lens mounted to camera body B. Main mirror 12, which is a movable mirror, reflects the incident light passing through photo-taking lens 2 and leads it to the viewfinder optical system, and simultaneously has transparent member 12a (a completely transparent member or opaque mirror) that allows the beam of light passing through photo-taking lens 2 to pass through to sub-mirror 14 located behind and at an angle to main mirror 12. When main mirror 12 is in a lower position, as shown in the drawing, automatic focus detection is possible. The beam of light passing through transparent member 12a is reflected by sub-mirror 14 to the bottom portion of camera body B, and is then led to automatic focus detection module 18 (hereinafter referred to as AF module 18) as the beam of light for use in automatic focus adjustment.

Aperture 16a for allowing said beam of light reflected off sub-mirror 14 to pass through is formed in a portion of bottom wall 16 of the mirror box which houses main mirror 12. AF module 18 mounted on the lower portion of mirror box bottom wall 16 is a module that performs focus detection and flash light amount determination, and fixed and held on basket body 18a of module 18 are optical path refracting mirror 24, condenser lens 4, infrared cut filter 26, re-imaging lens 6, photoreceptor element package 20 containing photoelectric conversion element arrays for focus detection and an SPC for flash light amount determination, viewfinder mask 22 and aperture mask 10. Located in the viewfinder optical system are such parts as Fresnel lens 28, condenser lens 35, pentagonal roof prism 30, eyepiece 32, optical path refracting lens 33 and light measurement element 34 for measuring the brightness of the object to be photographed prior to photo-taking.

Figure 2:
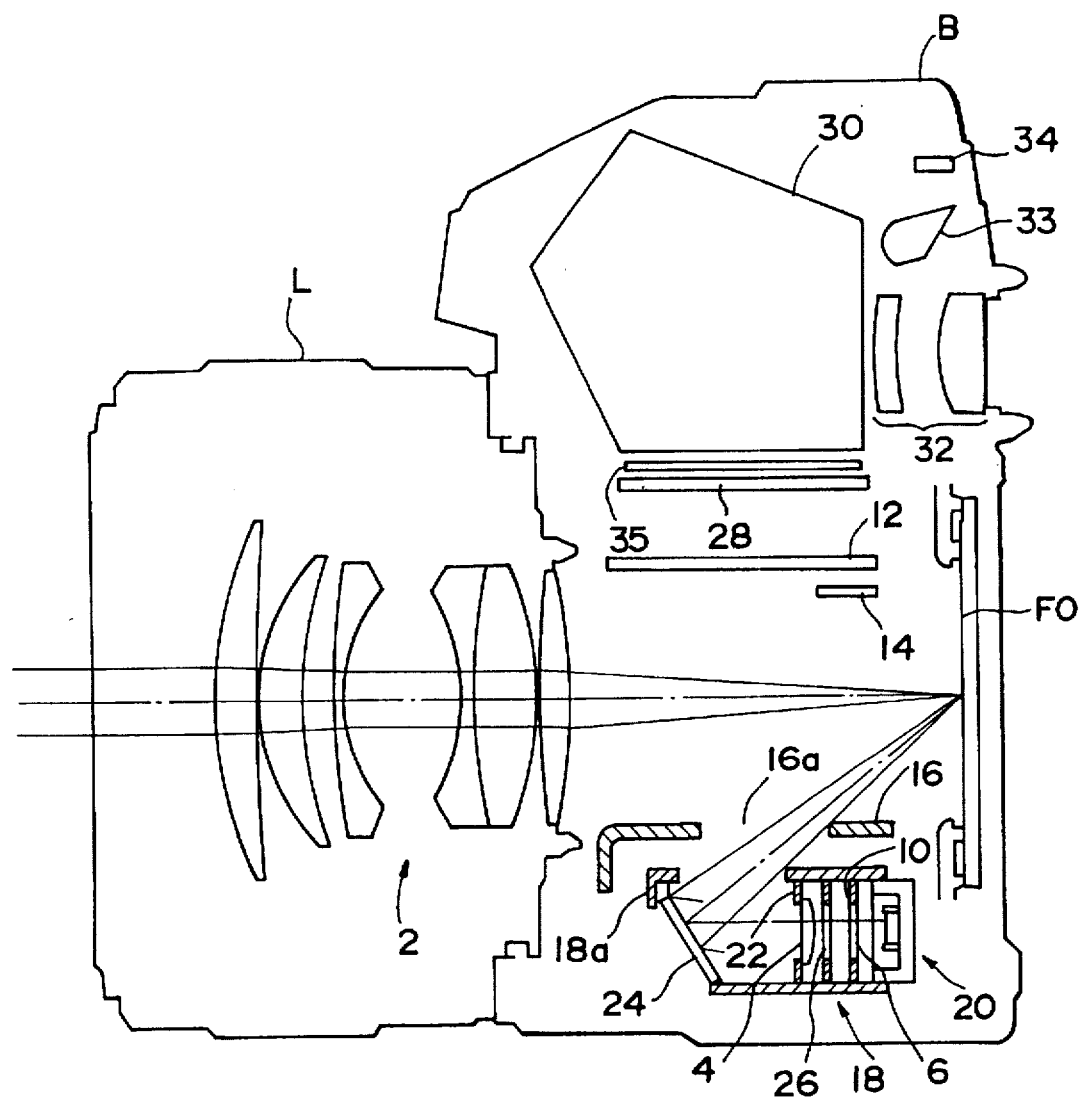
FIG. 2 is a drawing showing the film exposure time of said camera.

FIG. 2 shows the situation when the shutter is released in a single lens reflex camera of this embodiment. When the shutter is released, main mirror 12 and sub-mirror 14 are pushed up together to the upper portion of the camera body, and the beam of light passing through photo-taking lens 2 forms an image on film surface F0. In this condition, exposure is carried out by the opening of the focal plane shutter. Here, module 18 functions as a flash light amount determination module. When photo-taking with a built-in flash or external flash (not shown in the drawing) is performed, after the beam of light passing through photo-taking lens 2 forms an image on film surface F0, the reflected light is led to module 18 located at the lower part of the camera body as the beam of light to be used for flash light amount control. After this beam of light passes through each member, it is received by the SPC for performing flash light amount control located inside photoreceptor element package 20. When the amount of received light reaches a prescribed level, flash photo-taking with the appropriate amount of light can be performed through the output of a signal to the flash to stop emitting light.

Figure 3:
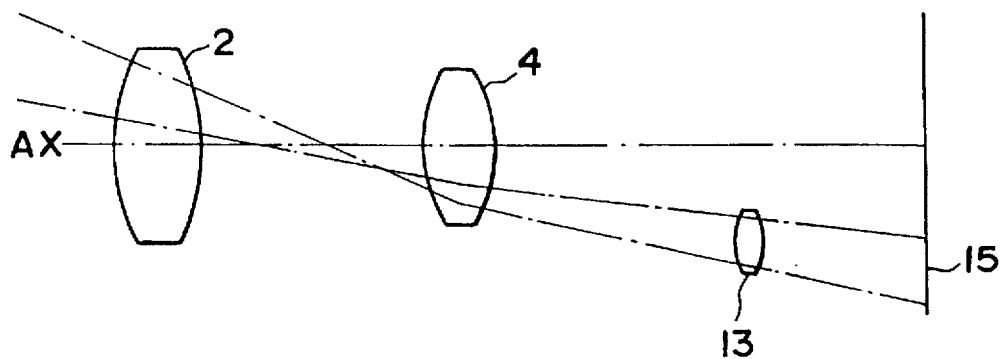
FIG. 3 is a drawing showing the optical system for controlling the flash light amount in said camera.

FIG. 3 is a drawing showing the AF optical system when flash light amount control is performed. Condenser lens 4 is the same lens that is used to perform focus detection, and lens 13 is a lens that is used to lead as an appropriate beam of light the beam of light that passed through photo-taking lens 2 and condenser lens 4 and was reflected from the film surface to light adjustment element 15 located on a sensor chip.

Figure 4:
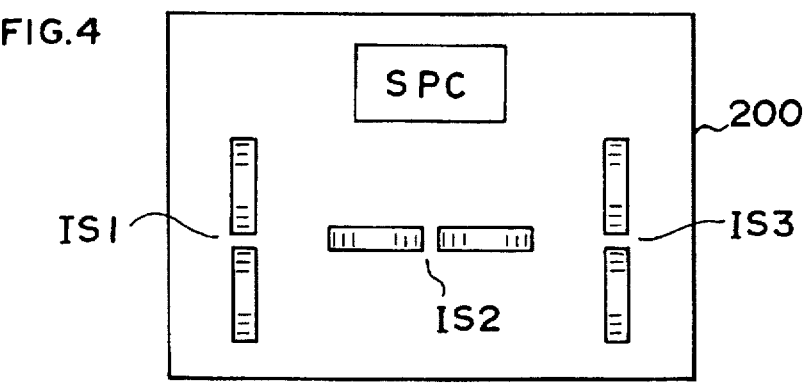
FIG. 4 is a drawing showing the arrangement of the focus detection element and the flash light amount determination element.

FIG. 4 shows the construction of a sensor chip employed in this embodiment which has photoelectric conversion element arrays and which is also used for flash light amount determination. The photoelectric conversion element arrays used for focus detection and the SPC for flash light amount determination are located in different areas, and the appropriate beam of light is led to their respective areas at the time of detection by each member. These are all formed on a single semiconductor chip. As shown in the drawing, three sets of focus detection photoelectric conversion element arrays IS1, IS2 and IS3 are employed in this embodiment. With this construction, vertical and horizontal focus detection may be performed simultaneously, thereby making focus detection along a horizontal line, etc. possible. A standard part and a reference part are located in each area, making focus detection based on the phase differential method possible.

Figure 5:
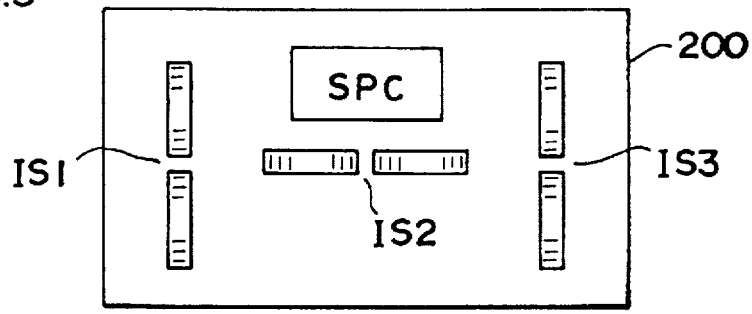
FIG. 5 is a drawing showing the arrangement of the focus detection element and the flash light amount determination element.

FIG. 5 shows a different embodiment of the construction of the sensor chip. The photoelectric conversion element arrays and the SPC for flash light amount determination need not be formed in different areas: by properly leading the beam of light via a member such as an re-imaging lens residing in a module, it is possible to use space for which there is no particular need among the areas of the photoelectric conversion element arrays for focus detection. With this construction, space may be effectively utilized, and the size of the sensor chip may be reduced.

Figure 6:
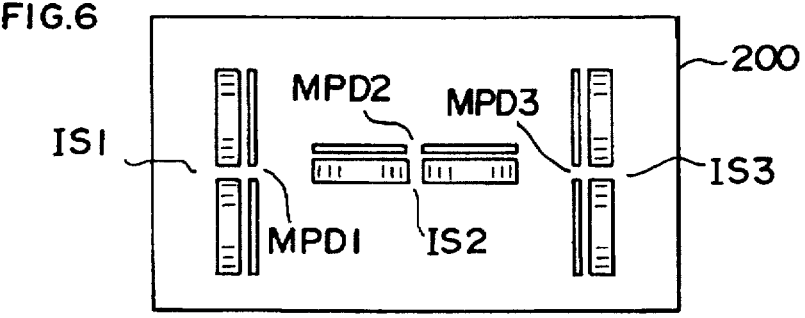
FIG. 6 is a drawing showing the arrangement of elements where the element used for monitoring focus detection is used for the flash light amount determination.

FIG. 6 shows another example of a construction of the sensor chip. Although they are omitted in FIGS. 4 and 5, monitoring photoreceptor elements MPD1, MPD2 and MPD3 for controlling the periods of electric charge storage are located near the photoelectric conversion element arrays. In this example, these monitoring photoreceptor elements also serve as flash light amount determination elements. With this construction, it is not necessary to have a separate flash light amount determination element, which reduces the cost. To speed up the responsiveness of these monitoring photoreceptor elements, it is desirable to have a construction in which each monitor is divided into a number of components, so that each monitor may be read out using different signal lines. The method of controlling the flash light amount using these monitoring photoreceptor elements is described below.

Figure 7:
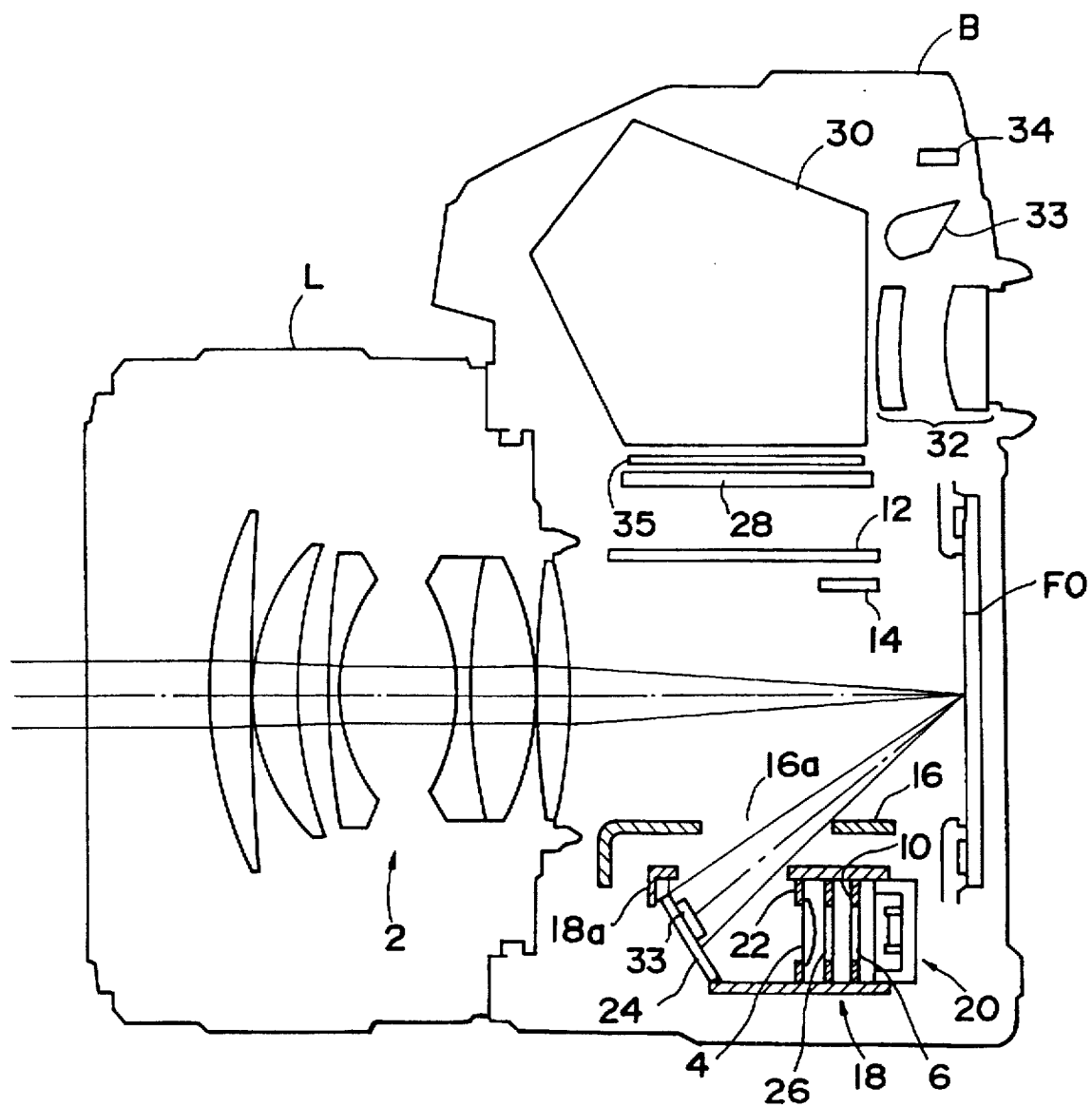
FIG. 7 is an outline construction diagram of a camera in which a different arrangement of the flash light amount determination element is shown.

FIG. 7 shows the construction of a different embodiment from that shown in FIG. 1. Only photoelectric conversion elements for focus detection are formed on the chip contained in photoreceptor element package 20. Flash light amount determination SPC 33 is located on a part of optical path refracting mirror 24 through which the beam of light for focus detection does not pass, and directly receives the reflected beam of light from the film surface. With this construction, the construction of the optical system inside the module may be simplified. In addition, if optical path refracting mirror 24 is constructed using an opaque mirror and flash light amount determination SPC 33 is located on the reverse side of or incorporated within the mirror, it is also possible to locate SPC 33 on a part through which the beam of light used for autofocusing passes.

Figure 8:
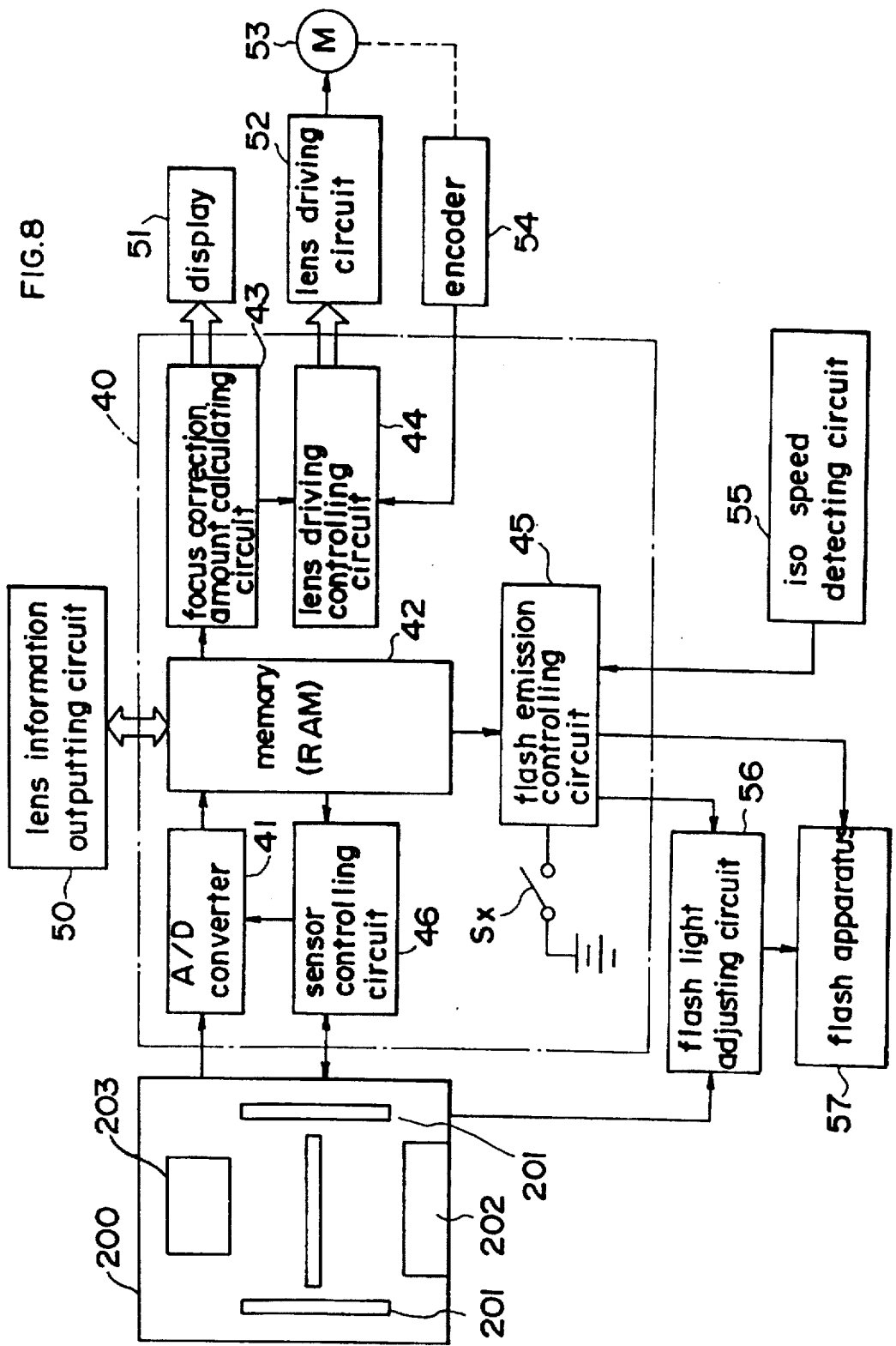
FIG. 8 is a block diagram of a control device of said camera.

FIG. 8 shows sensor 200 and controller 40 and their peripheral circuits in the camera of this embodiment. Controller 40 comprises a single microcomputer chip which includes A/D conversion circuit 41 that converts the signal obtained from an analog signal output line that outputs the photoelectric conversion value from sensor 200 into a digital signal, as well as memory 42 formed of RAM that inputs beforehand defocus amount lens zoom-out amount conversion coefficient KL that is output from lens data output circuit 50 including the photo-taking lens (exchangeable lens) ROM and is different as to each lens, as well as color temperature compensation value data, etc., and holds digital data from A/D conversion circuit 41.

Moreover, controller 40 has focus detection calculating circuit 43 that performs focus detection based on the output from memory 42 and calculates a compensation amount from the detected focus data and lens data, etc., lens drive controlling circuit 44 that based on said compensation amount sends a signal to drive the lens to lens drive circuit 52 and receives lens movement status data from encoder 54, sensor controlling device 46 that sends and receives a signal to and from sensor 200, and flash controlling circuit 45 that closes synchroswitch Sx in accordance with flash light emission operation, sends a light emission commencement signal to flash 57, and controls the emission of light from internal or external flash 57 based on the film speed read via film speed reading device 55. 56 is a flash light adjustment circuit that sends a light emission termination signal to the flash based on the output from the flash light amount controlling SPC.

In addition, 53 is a lens drive motor, and 51 is a display circuit controlled by controller 40. Sensor 200 and controller 40 are formed separately on different chips. Sensor 200 includes focus detection photoelectric conversion element 201, drive circuit 202 for the photoelectric conversion element and flash light amount controlling SPC element 203. Light adjustment circuit 56 is located outside of this chip in FIG. 8, but by integrally forming this circuit on the sensor chip, space may be more effectively utilized.

Figure 9:
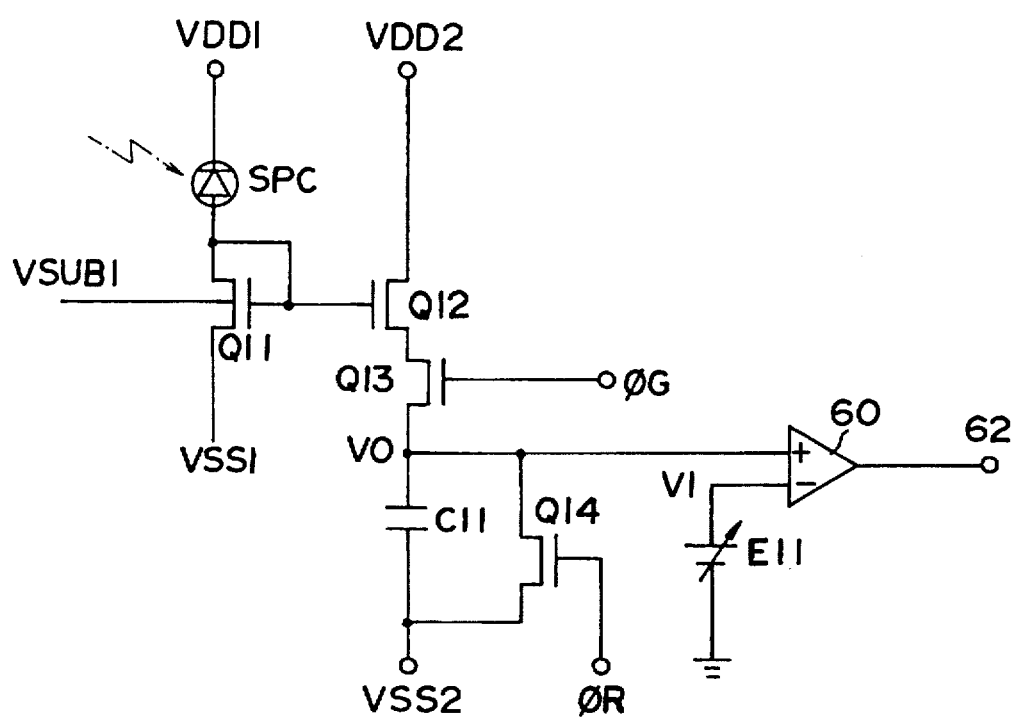
FIG. 9 is a circuit diagram of the flash light amount controlling circuit.

Next, the detailed construction of drive circuit 202 and flash light adjustment circuit 56 for flash light amount control will be explained with reference to FIG. 9. This circuit is a flash light adjustment circuit that stores the light reflected off the film surface during exposure in photometric element SPC and controls the amount of light emitted by the flash. In other words, flash light adjustment circuit 56 comprises photometric element SPC comprising a pnjunction photocell, etc., MOS transistors Q11–Q14, integrating capacitor C11, variable voltage device E11 and comparator 60, etc., performs logarithmic compression of the electric current output via the receiving of light by photometric element SPC, and stores the electric charge in capacitor C11.

To explain the construction of said circuit in detail, the anode of the photometric element SPC is connected to the drain and gate of first n-channel MOS transistor Q11 and the gate of second n-channel MOS transistor Q12. In addition, DC voltage VDD1 is impressed on the cathode of photometric element SPC, and DC voltage VDD2 is impressed on the drain of transistor Q12. Moreover, DC voltage VSS2 is connected to the source of transistor Q12 via MOS transistor Q13 and capacitor C11. On the other hand, VSUB 1 is imprinted onto the baseboards of MOS transistors Q11 and Q12. With this circuit, logarithmic compression is performed to the integral value of the photoelectric current from photometric element SPC, which value then becomes voltage V0 at the junction of the source of MOS transistor Q13 and capacitor C11. Comparator 60 compares V0 with voltage V1 from variable voltage device E11, which serves as the standard voltage, and outputs a comparison signal to signal line 62.

Integration-based control is explained as follows. The shutter release operation is performed under the flash phototaking condition, and when the shutter opens, a light emission commencement signal is sent to flash 57 from controller 40 (FIG. 8). At the same time, signal φR is impressed on the gate of transistor Q14 connected in a parallel fashion to capacitor C11, and after capacitor C11 is reset, signal φG is impressed on the gate of transistor Q13, whereby transistor Q13 is set to ON, and integration is begun. This integral value is compared with standard voltage V1 given by variable voltage device E11 and established beforehand based on the film speed, and when they have reached the same level, a light emission termination signal is sent to flash 57 via signal line 62, and light emission is stopped. In this way, flash light emission appropriate to the film speed may be performed.

Furthermore, based on the standard value provided by variable voltage device E11, the digital signal from controller 40 is converted into an analog signal by a D/A converter (not shown in the drawing), and by inputting this signal into flash light adjustment circuit 56, Q11 and Q12 are able to absorb variation discrepancies, and effective control of the flash's emission of light corresponding to the film speed may be performed.

Figure 10:
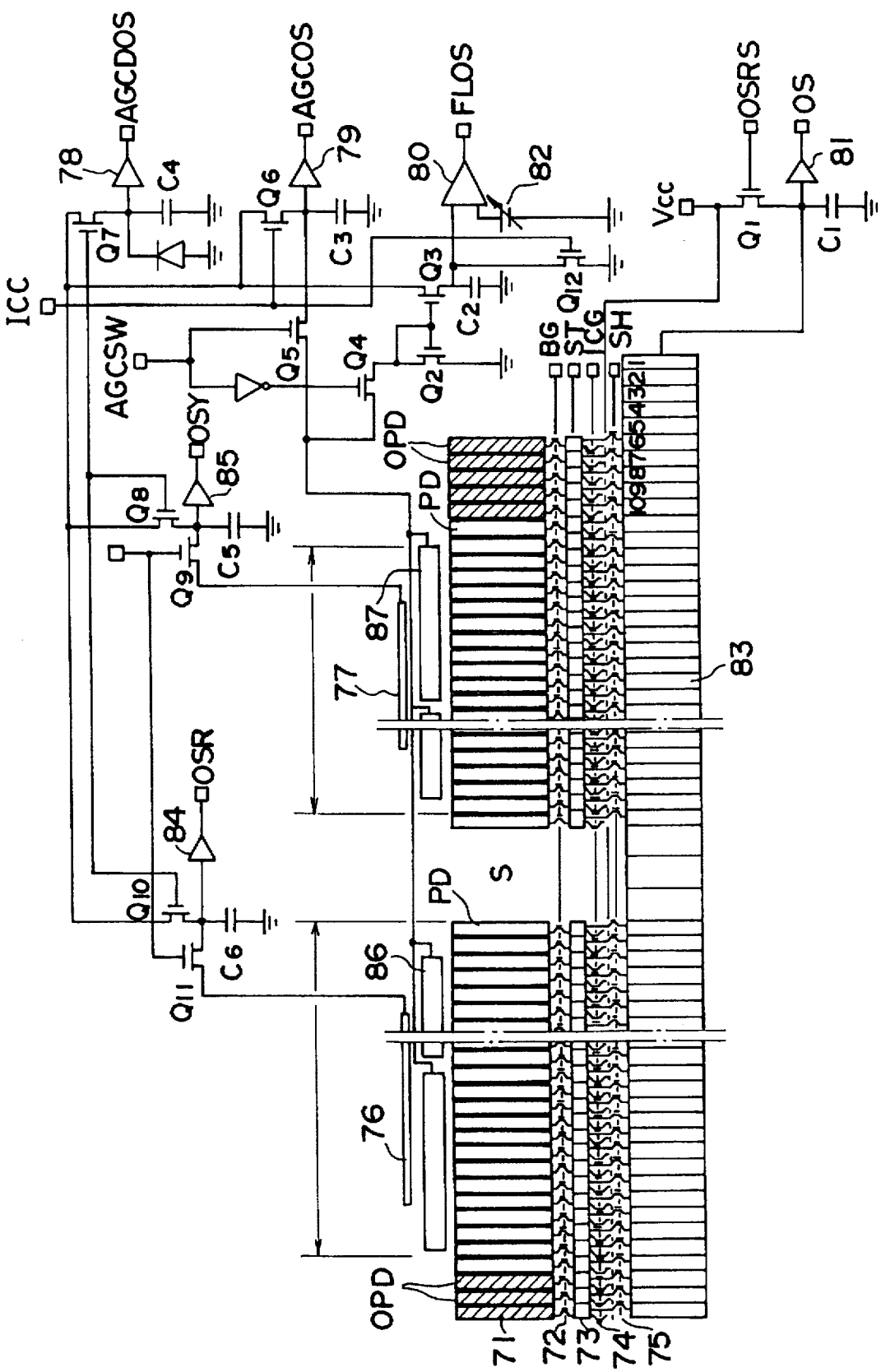
FIG. 10 is a detailed drawing of the IS2 and MPD2 parts of FIG. 6.

FIG. 10 is a detailed drawing of the embodiment in FIG. 6 that employs a storage period control monitor for the focus detection element for flash light amount control without using a separate element. In FIG. 10, one area of the embodiment in FIG. 6, photoelectric conversion element array IS2, for example, is shown. The photoelectric conversion element is comprised of photodiode array 71 generating a photoelectric charge in response to the amount of light emitted, barrier gate 72, storage part 73 that temporarily stores said charge, storage part clear gate 74, shift gate 75, shift register 83 and color temperature detection photodiodes 76 and 77.

In addition, the photoelectric conversion element has, as output buffers for the above, output buffer 81 for shift register 83, output buffers 84 and 85 for color temperature detection photodiodes 76 and 77, output buffer 78 for the monitor output compensation signal for performing dim-ambient-light-compensation to the output from monitor photodiodes 86 and 87 (MPD2), as well as output buffer 79 for when the output from monitor photodiodes 86 and 87 is used to perform focus detection, and is further equipped with logarithmic compression members Q2 and Q3 that perform logarithmic compression to the output when the above element is used for flash light emission control, and comparator 80. Furthermore, BG, ST, ICG and SH shown in the drawing are control signals for controlling each element of said photoelectric conversion elements.

Color filters, each having different surface characteristics, are attached to color temperature detection photodiodes 76 and 77. The output from these photodiodes is output as yellow temperature detection signal OSY and red temperature detection signal OSR. The approximate color temperature of the object to be photographed may be detected by the ratio R of these two outputs VOSR and VOSY. In other words, if this ratio is large it is determined that the incident light is largely composed of short-wavelength light and that the color temperature is high, and conversely, if the ratio is small it is determined that the incident light is largely composed of long-wavelength light and that the color temperature is low. When this color temperature information and a photo-taking lens color temperature correction coefficient are used, the effect of detection errors in the focus detection device arising due to axial chromatic aberrations occurring in connection with the photo-taking lens may be reduced.

The switching between the camera situation in which the output from monitor photodiodes 86 and 87 is used for monitoring focus detection and that in which it is used for flash light amount control is performed using alternating switches Q4 and Q5. Where the output is used for monitoring focus detection, AGCSW is made to output a 'High' signal, transistor Q5 is turned ON and transistor Q4 is turned OFF, as a result of which the output from the monitor photodiodes is stored in capacitor C3, and by outputting it to AGCOS via output buffer 79, the output from monitor photodiodes 86 and 87 is used for controlling the period of electric charge storage for focus detection.

On the other hand, where the above output is used for light flash amount control, AGCSW is made to output a 'Low' signal, transistor Q5 is turned OFF and transistor Q4 is turned ON, as a result of which the output from monitor photodiode is stored in capacitor C2 after undergoing logarithmic compression by transistors Q2 and Q3. The value stored in capacitor C2 and variable voltage device 82's standard voltage previously established in accordance with the film speed are compared by comparator 80, and when they reach the same level, a flash light emission termination signal is sent to FLOS.

Next, the method of control when the monitor photometric conversion element shown in FIG. 6 is used as a flash light emission control element is explained. In this case, the detection of the light reflected from the film surface and used for flash light emission control is limited to focus detection areas, for example three such areas in this embodiment. Therefore, where the object to be photographed leaves the focus detection area, especially during panning, it is possible that appropriate flash light emission will not occur.

Figure 11:
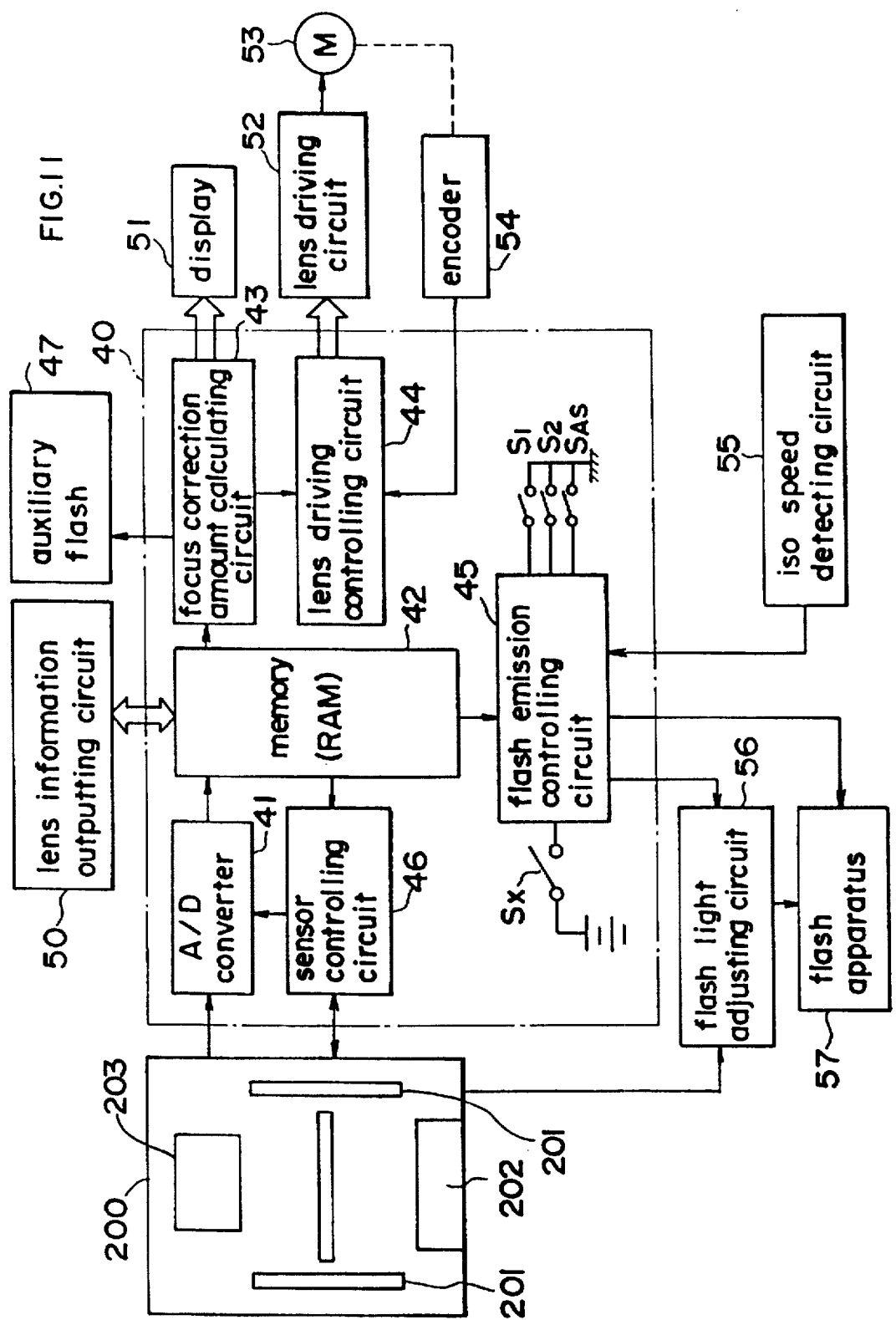
FIG. 11 is a block diagram showing a different embodiment of the control device for said camera.

FIG. 11 is a block diagram of the circuits required when the embodiment shown in FIG. 6 is employed, with added parts to the embodiment shown in FIG. 8. To explain the added parts, 47 is a focus detection auxiliary light device consisting of a flash device, and it is also used for preliminary illumination during flash control. Switch S1 is a switch that is operated in order to perform preliminary photo-taking operations such as autofocusing, and is turned ON when a release button not shown in the drawings is pressed with a first stroke. Switch S2 is a switch that is operated in order to carry out photo-taking, and is turned ON when a release button not shown in the drawings is pressed with a second stroke. Switch SAS is a switch that is operated in order to carry out selection of a flash light adjustment area.

Figure 12:
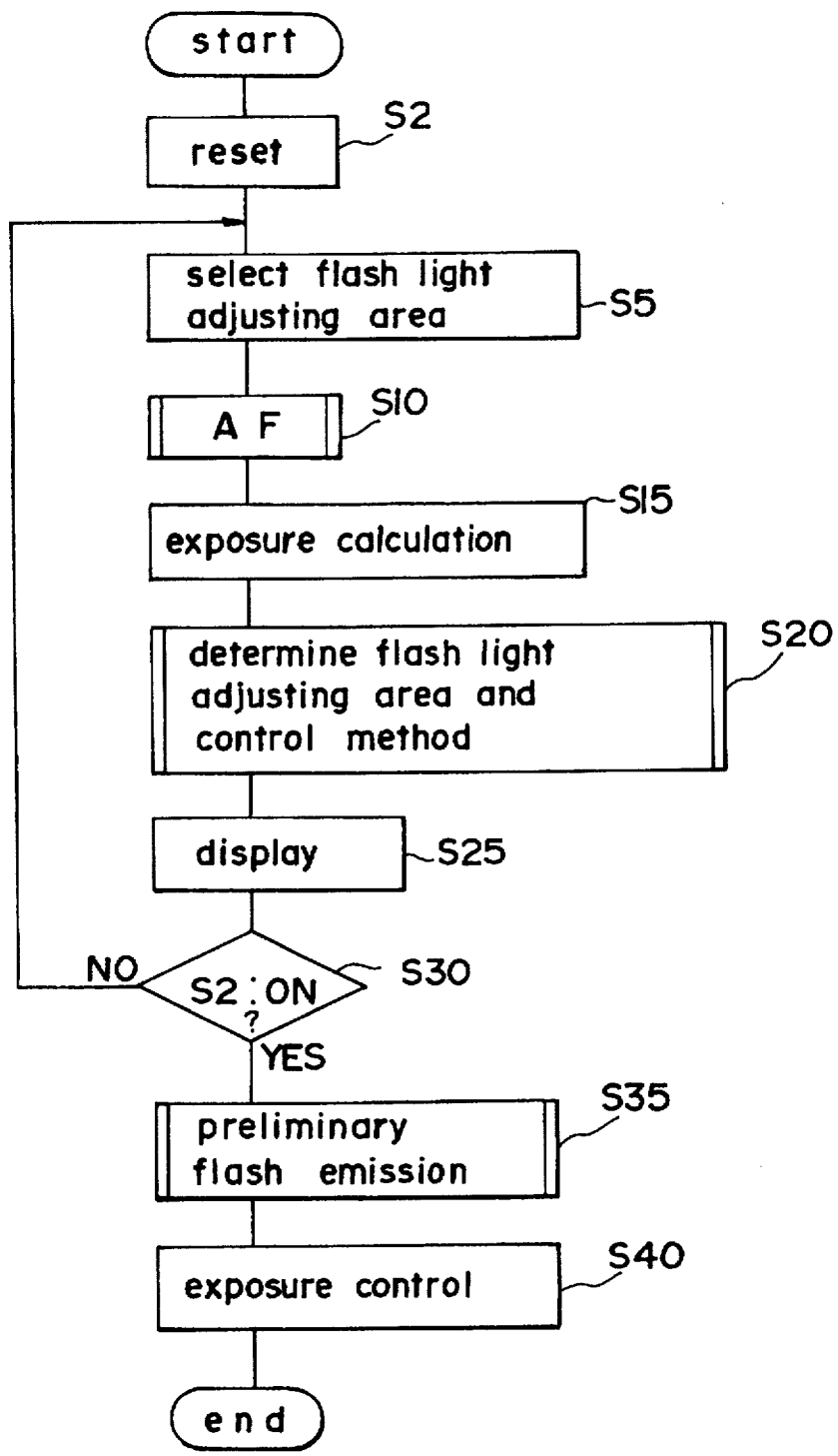
FIG. 12 is a flow chart of the main routine.

In light of the above, a flow chart of the routine of controlling flash light emission to obtain an appropriate flash is shown in FIG. 12 through FIG. 20. When the release button is pushed to the first stroke, turning preliminary photo-taking switch S1 ON, the photo-taking routine shown in FIG. 12 is carried out, and flags are reset (S2). Then, the flash light adjustment area is first selected (S5). Here, when switch SAS is operated, it results in a cyclical alternating of areas, i.e., auto, 1, 2, 3, auto, etc. When the switch is not operated, the alteration does not occur. These areas 1, 2 and 3 correspond to areas 1, 2 and 3 shown in FIG. 21, and flash light adjustment control is performed using the sensors for these areas. Next, the AF subroutine is carried out in step S10, exposure calculations are performed in step S15, and the flash light adjustment area/control method determination subroutine is performed in S20, and a display is made based on these steps (step S25). Next, it is determined in step S30 whether switch S2 was turned ON. If switch S2 was not turned ON, the routine returns to step S5, and if it was turned ON, the routine proceeds to step S35. In the preliminary flash emission subroutine of step S35, preliminary flash emission control is carried out for flash photo-taking for when focus detection is impossible. Exposure control is then performed in step S40, completing the photo-taking routine.

When the above exposure control is performed, terminal ICC in FIG. 10 is turned ON for a prescribed period in response to the completion of the raising of an observation mirror not shown in the drawings, capacitor C2 emits a charge, and in response to the switching ON of synchro-switch Sx, terminal AGCSW is set to 'Low' level in order to begin the charging of the flash light reflected off the film surface into capacitor C2. In this way, flash light adjustment control is performed. Incidentally, where control is performed based on the flash guide number, flash light adjustment control is not performed, and so element AGCSW is not set to 'Low' level.

Figure 13:
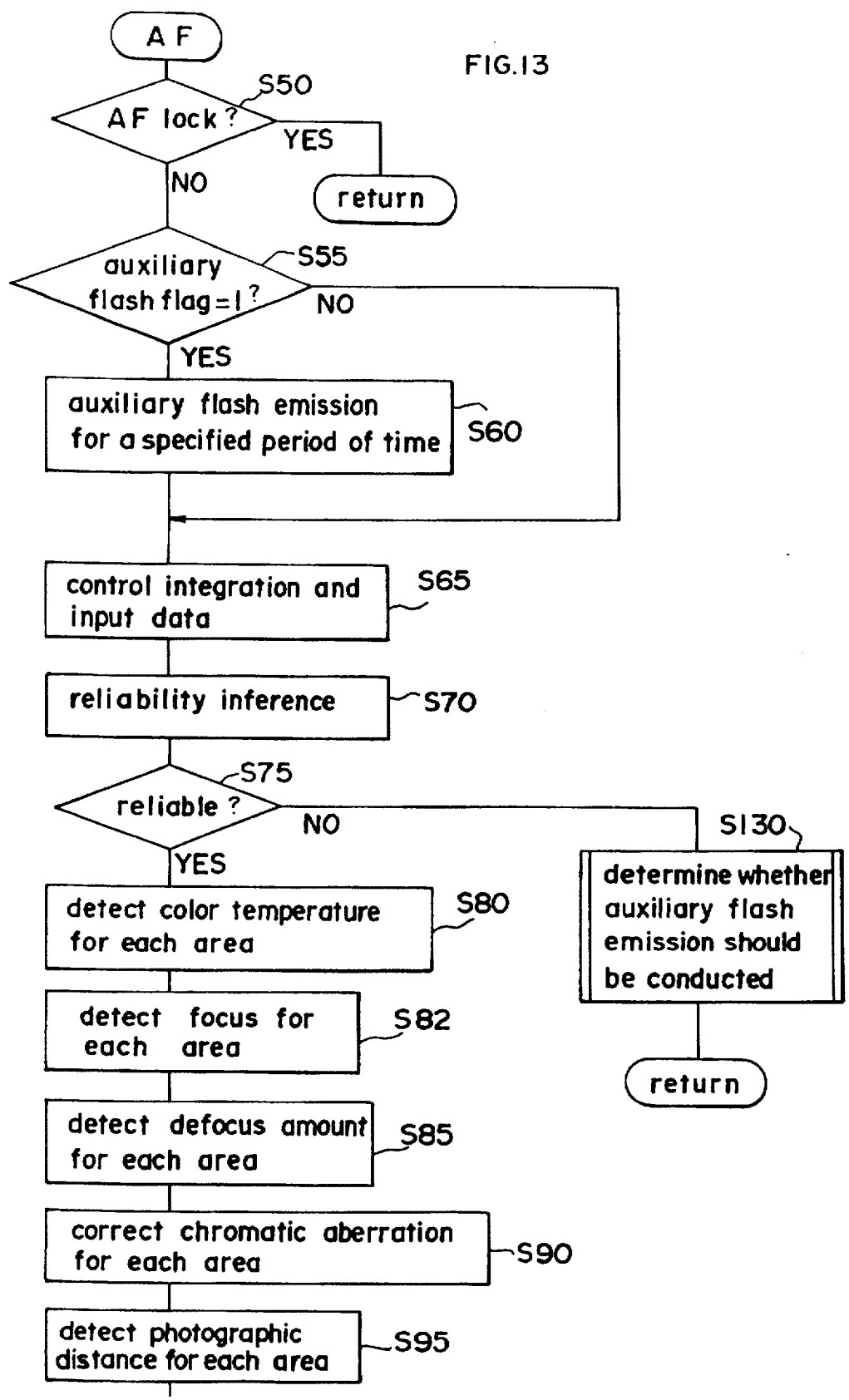
FIG. 13 is a flow chart of the AF subroutine shown by Step S10 in FIG. 12.
Figure 14:
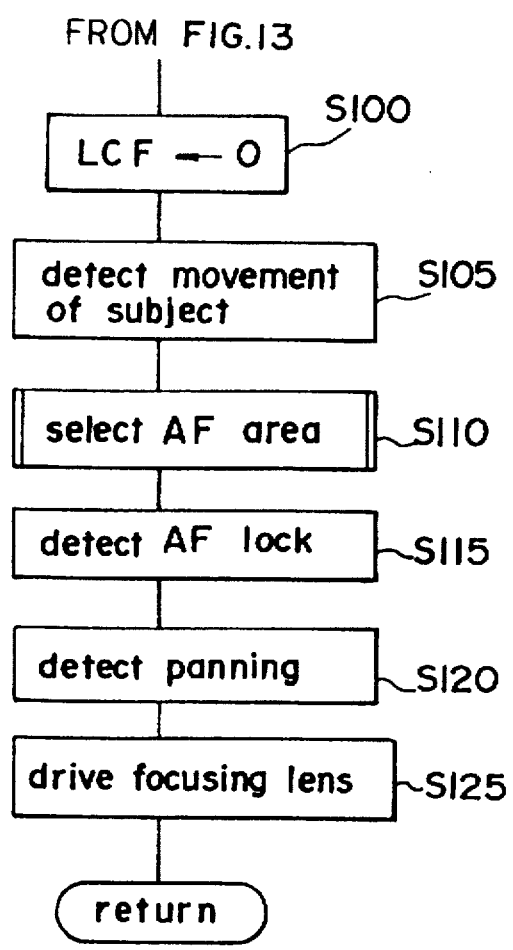
FIG. 14 is a continuation of the flow chart in FIG. 13.

The AF control subroutine of step S10 shown in FIG. 12 is explained below with reference to FIGS. 13 and 14. First, it is determined in step S50 whether the camera is in AF lock mode. If it is in AF lock mode (Y), the routine returns without performing autofocusing. If it is not in AF lock mode (N), the routine proceeds to step S55 to perform autofocusing. AF lock mode detection is performed in step S115: as the method to do this, for example, focus detection is performed several times after the photo-taker operates a movable member on the camera, and if the detection results indicate that the focus position falls within a prescribed range, the camera enters AF lock mode after determining that the object to be photographed is stationary.

Returning to the explanation of step S55, it is determined in step S55 whether a flag indicating auxiliary light emission mode (auxiliary light F) is set, and if it is set, control is performed so that auxiliary light is emitted for a prescribed period of time necessary for integral control (step S60), and integral control and data input are performed (S65). If the auxiliary light flag is not set, step S60 is skipped and the routine proceeds to step S65 and integral control and data input are performed.

Next, in step S70, reliability is detected based on the data input, and reliability is then determined based on the results of this reliability detection (S75). If reliability is determined to exist (Y), the color temperature of each focus detection area is detected in step S80, focus detection is further performed for each area (S82), the defocus amount is obtained for each area (S85), said defocus amount is corrected in response to the previously detected color temperature for each area (S90), and the distance for each area is calculated based on this correction data (S95).

Next, flag LCF indicating the impossibility of focus detection is reset in step S100, detection of a moving object within a two-dimensional plane is carried out in step S105, and based on the results of this detection operation, the AF area selection subroutine is performed in step S110 and the AF area is selected. Then, AF lock detection (S115) and panning detection (S120) are performed, lens drive is carried out based on the defocus amount for the AF area selected in step S10 (S125), and the process then returns to the main routine.

If it is determined in the reliability determination of step S75 that there is no reliability, the auxiliary light determination subroutine is performed, and then the process returns to the main routine.

Figure 15:
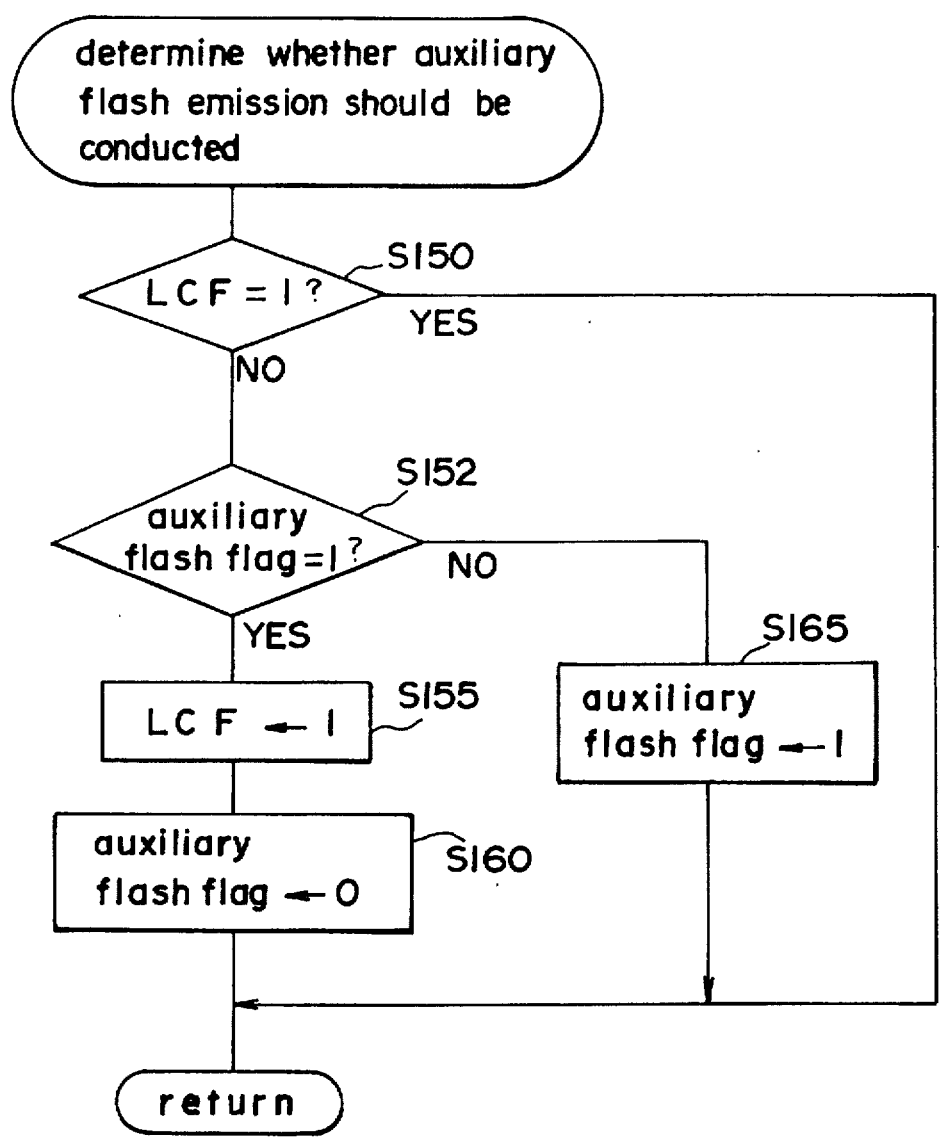
FIG. 15 is a flow chart of the auxiliary light determination subroutine shown by Step S130 in FIG. 13.

To explain the auxiliary light determination subroutine shown in FIG. 15, first, it is determined in step S150 whether flag LCF indicating the impossibility of focus detection is set, and if it is not set (N), it is determined in step S152 whether the auxiliary light flag (auxiliary light F) is set, and if the auxiliary light flag is set (Y), auxiliary light is emitted, flag LCF indicating the impossibility of focus detection as well as the completion of one cycle of this subroutine is set (S155), the auxiliary light flag is reset (S160) so that auxiliary light is not emitted based on subsequent focus detection, and the process then returns to the main routine. If the auxiliary light flag is not set in step S152, the auxiliary light flag is set to allow focus detection after the emission of auxiliary light (S165), and the process returns to the main routine. If flag LCF is set in step S150, the process returns to the main routine from there. In this way, where subsequent focus detection is impossible, focus detection may be performed without the emission of auxiliary light even if focus detection is performed repeatedly.

Figure 16:
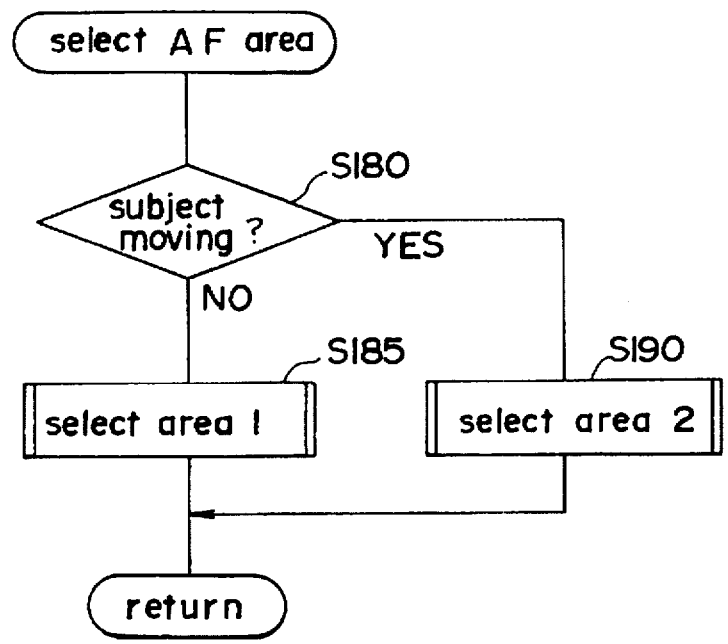
FIG. 16 is a flow chart of the AF area selection subroutine shown by Step S110 in FIG. 14.
Figure 17:
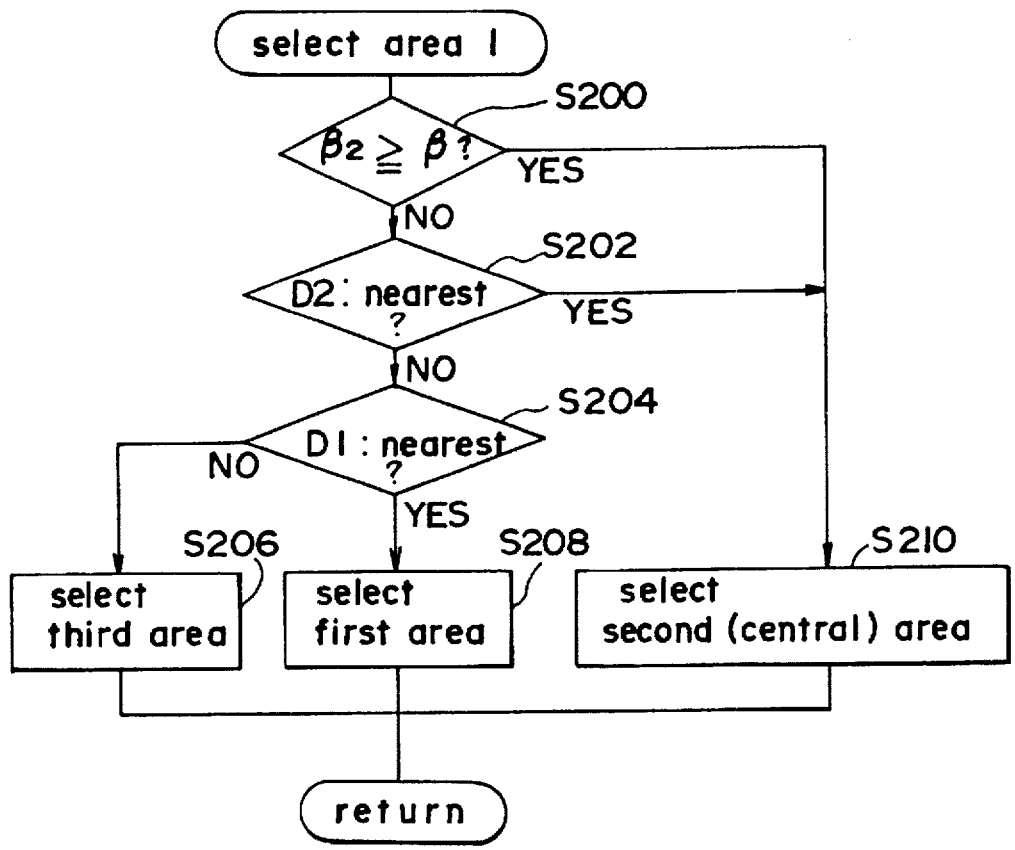
FIG. 17 is a flow chart of the AF area selection 1 subroutine shown by Step S185 in FIG. 16.
Figure 18:
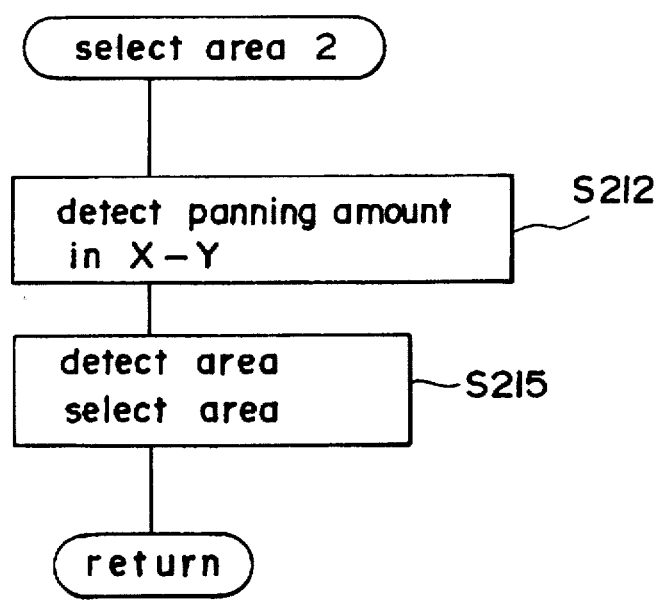
FIG. 18 is a flow chart of the AF area selection 2 subroutine shown by Step S190 in FIG. 16.

Next, the AF area selection subroutine is explained with reference to FIG. 16. First, moving object determination is performed in order to determine whether the object to be photographed is a moving object (S180), and if it is not a moving object, area selection subroutine 1 is performed (S185), and if it is a moving object, area selection subroutine 2 is performed (S190), and the process then returns to the main routine.

The controller selects the AF area, according to the flow chart showing area selection subroutine 1 (FIG. 17), for example. First, it is determined whether the object to be photographed magnification $\beta2$ in the second (central) area is larger than prescribed value $\beta$ (S200), and if it is, the central area is selected (S210), and autofocusing is performed on the object to be photographed in that area. If the object to be photographed magnification $\beta2$ is smaller than prescribed value $\beta$, the object to be photographed with the shortest distance among object to be photographed distances D1, D2 and D3 corresponding to three areas is selected (S202, S204), and autofocusing is performed with regard to that object to be photographed (S206, S208, S210). In area selection subroutine 2 shown in FIG. 18, the amount of movement of a moving object to be photographed per unit of time in a two-dimensional area is detected in step S212, the object to be photographed area is detected and selected in step S215 based on the previously detected amount of movement, and the process then returns to the main routine.

Determination of panning is performed based on the output of a focus detection photoelectric conversion element or a photometric element or a dedicated panning detection element. As a method for performing panning detection, the amount of panning may be detected by, for example, obtaining the correlation of the light distribution patterns of the output of said element at prescribed time intervals and the amount of time discrepancy. Furthermore, to describe this in more detail, the output of the element in a horizontal direction at times t is shown as follows:

$$\chi 0(t), \chi 1(t), \ldots, \chi n(t)$$

and further the output of the element in a horizontal direction after time interval T has elapsed is shown as follows:

$$\chi 0(t+T), \chi 1(t+T), \ldots, \chi n(t+T)$$

Where the correlation of these two outputs is represented as $$P0 = \sum_{i=0}^{n} \{x_i(t) - x_i(t+T)\}^2$$

the correlation when there is an aberration of N pixels may be represented as $$PN = \sum_{i=0}^{n-2N} \{x_i(t) - x_{i+N}(t+T)\}^2$$

When the value of N is changed, the discrepancy amount N which makes the value of PN smallest is the amount of panning per time interval T. If the space between pixels on the film surface is 1, the amount of panning on the film surface per time interval T is N·1. If this value exceeds a prescribed value, it is determined that panning was performed. In addition, panning may also be detected from the degree of change in the position of the center of the light distribution pattern over a prescribed time interval. Furthermore, it is also possible to use not only the output from a photoelectric conversion element, but also a dedicated element such as an angular accelerator sensor.

Figure 19:
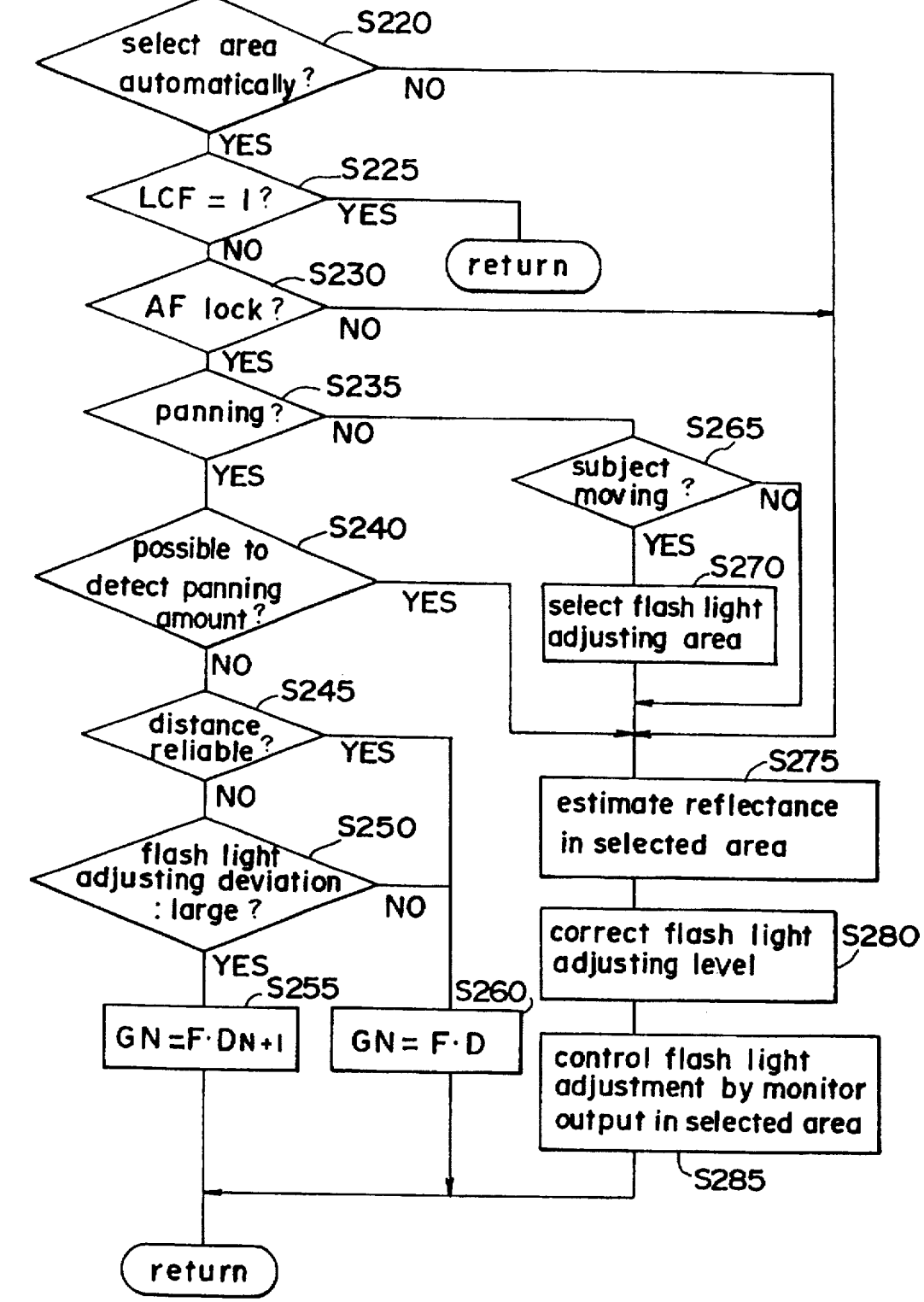
FIG. 19 is a flow chart of the flash light adjustment area/control method determination subroutine shown by Step S20 in FIG. 12.

Next, the subroutine for the flash light adjustment area/ control method determination is explained with reference to FIG. 19. First, it is determined in step S220 whether flash light adjustment area selection is set to auto, and if it is set to auto, flag LCF indicating whether focus detection is impossible is checked in step S225, and if focus detection is impossible (LCF=1), the process returns to the main routine, preliminary flash emission described below is performed, and the flash is controlled. If focus detection is not impossible (LCF=0), it is determined in step S230 whether AF lock is on, and if AF lock is present, it is determined whether a panning operation was performed (S235).

Where panning was not detected via the panning detection operation ('NO' in S235), the process proceeds to the determination in step S265 of whether the object to be photographed is a moving object, and if the object to be photographed is determined to be a moving object, a flash light adjustment area for exposure is selected (S270) in accordance with the amount of movement along the X and Y axes, and the process proceeds to step S275 in order to perform flash light emission control based on the output from the monitor photoelectric conversion element for the selected area. If it is determined in step S265 that the object to be photographed is not a moving object, the process proceeds to step S275 without performing any other operation. When panning is detected, it is determined in step S240 whether the amount of movement was obtained correctly. The precise amount of movement where the object to be photographed leaves the element area during extensive panning cannot be determined by the above panning detection method. In addition, flash light amount control cannot be performed for a object to be photographed that is outside the element area. Therefore, where the amount of movement is correctly detected, flash light amount control is performed by the monitor element for the area as to which it is inferred that the main object to be photographed is moving, and the process then proceeds to step S275. If the amount of movement is not correctly detected, flash light emission control using distance information (D) prior to AF lock, i.e., flashmatic control, is performed. However, due to errors in the system, the distance information is not necessarily reliable. Therefore, the reliability of the distance information is determined (S245), and where the information is reliable, the above control is performed (S260).

The reliability of the distance information depends on focal length f of the photo-taking lens, magnification β, object distance D, etc., and can be quantified: the reliability of the distance information may be determined by, for example, whether the product of f and β exceeds a prescribed value. Where the distance information is reliable, GN control is performed, without performing flash light emission control via the monitor photoelectric conversion element, using flash guide number GN indicated by $$GN = F \times D$$

using pre-AF lock distance D and aperture value F determined by exposure calculation. Therefore, the appropriate amount of light emission may be obtained even where the object to be photographed has left the element area.

Next, where the distance information is not reliable ('NO' in step S245), the above GN control is performed using information from a distance encoder located in the middle of the photo-taking lens and corresponding to the position of the lens. The camera has encoders inside the photo-taking lens corresponding to lens positions d1, d2, ..., dN, and enters distance information D1, D2, ..., DN corresponding to each encoder value in an internal memory. However, D1 is deemed the shortest object distance. When distance information corresponding to the lens position when the photo-taker activates AF lock is deemed to be DN, a flash light amount control error arising due to the resolving power regarding the encoder value can equal $(D_{N+1}/D_{N-1})^2$ at the maximum. This value is considered to be a flash light adjustment error, and where it falls within a prescribed level, the flash light adjustment error is determined not to be large ('NO' in step S250), and the above GN control is performed (S260) with $$GN = F \times D$$

Where the value indicating the above error exceeds a prescribed level, the flash light adjustment error is determined to be large ('YES' in step S250), and the above GN control is performed (S255) using the farthest distance within the error range with $$GN = F \times D_{N+1}$$

In this way, it is possible that exposure will tend to be somewhat long, but insufficient exposure will not occur, and poor-quality photos may be avoided.

In some cases using the above method of control, for example, where the lens does not have internal distance encoders, the same sort of control may be performed using a distance counter inside the controller. Incidentally, where the above distance information is not reliable, photo-taking situations in which errors are likely to occur may be avoided by indicating a warning or by preventing shutter release or flash light emission. Where there is an electronic zoom lens, light emission control based on aperture control may be performed after zooming the lens to an area where the distance information is reliable, obtaining the distance, and then returning to the original focal length.

In addition, the above example represented a case in which autofocusing is performed on photo objects within a certain area, but even where focus adjustment is performed manually by the photo-taker, similar control may be performed with the area closest to the in-focus situation as the selected area. Furthermore, where the photo-taker designates the AF area by operating a movable member, flash light emission control may be performed using the monitor photoelectric conversion element for that area.

When it is determined in step S220 that flash light adjustment area selection is not set to auto (i.e., that it is set to manual), or when it is determined in step S230 that AF lock is not on, the procedure beginning with step S275 is followed to perform flash light adjustment using the monitor element for the selected area. First, the reflectance of the object to be photographed is inferred in step S275 from the color temperature of the selected area. Adjustment of the flash light adjustment level is carried out in step S280 from the inferred reflectance, flash light adjustment control is performed in step S285 based on the selected area monitor output, and the process then returns to the main routine.

Figure 20:
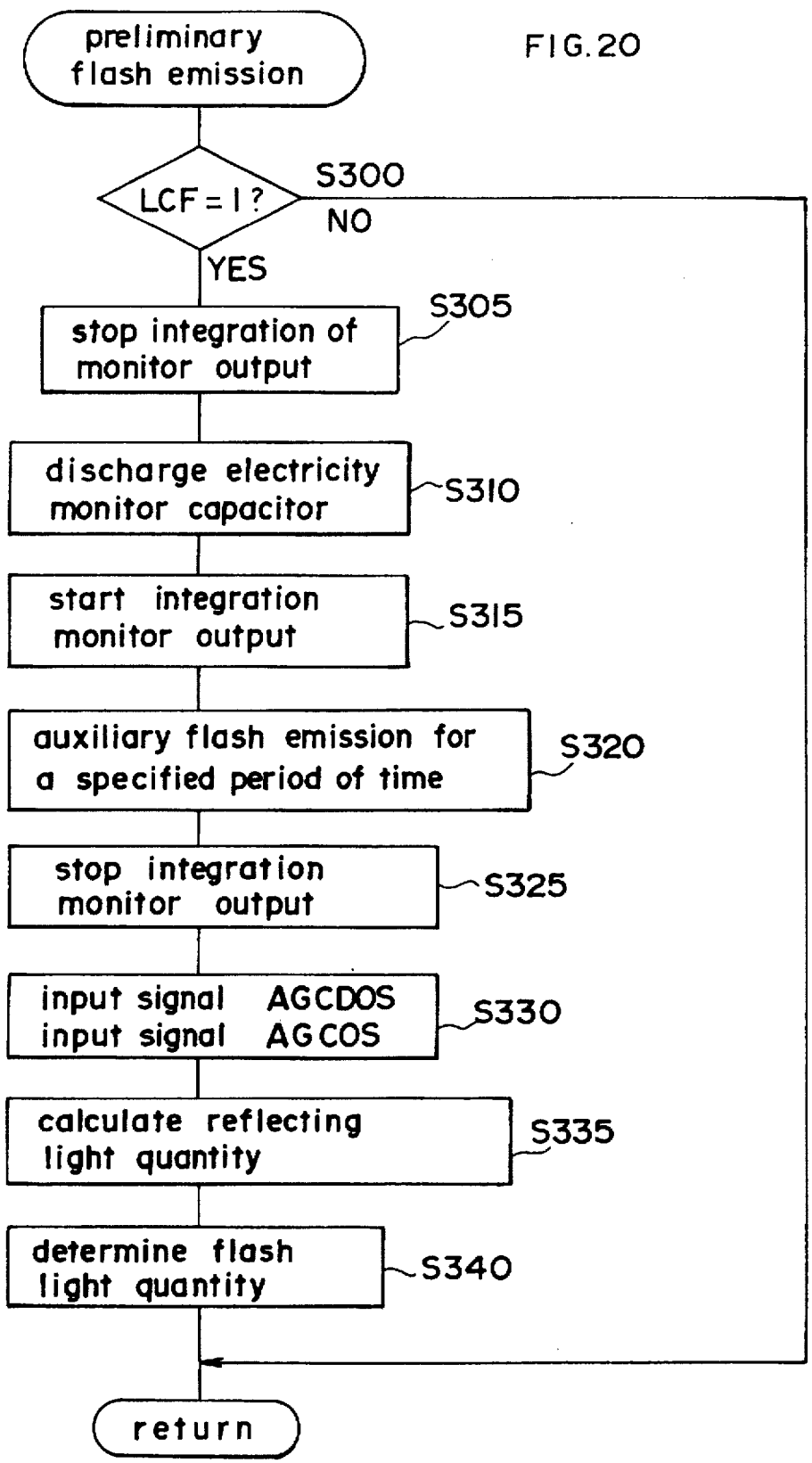
FIG. 20 is a flow chart of the preliminary flash emission subroutine shown by Step S35 in FIG. 12.
Figure 21:
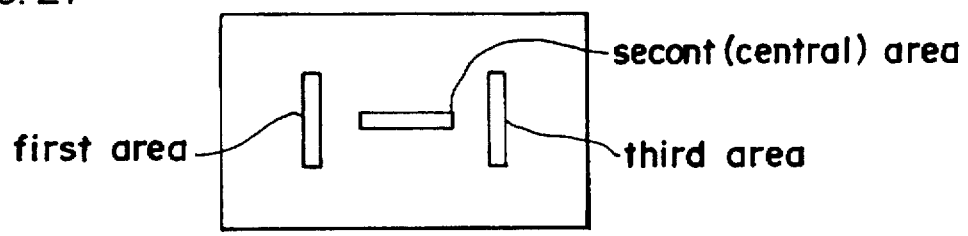
FIG. 21 is a diagram showing the focus detection areas.

Next, the preliminary flash emission subroutine of step S35 shown in FIG. 12 is explained with reference to the flow chart in FIG. 20. First, in step S300 it is determined via flag LCF whether or not focus detection is impossible, and if it is not impossible (LCF=0), the process returns immediately to the main routine, and flash light amount control is performed using the control method decided on in FIG. 19. If focus detection is impossible (LCF=1), the process proceeds to S305, terminal AGCSW is set to 'Low' level, monitor integration is halted, terminal ICC is turned ON for a prescribed period of time, and the monitor capacitor discharges an electric charge (S310). Terminal AGCSW is then set to 'High' level and integration is begun (S315), and then autofocus auxiliary flash emission is carried out for a prescribed period of time (S320). Next, terminal AGCSW is set to 'Low' level in order to halt integration. Data AGCDOS and AGCOS which are output at that time are then input (S330), the amount of light reflected from the object to be photographed is obtained based on the difference between those two signals (S335), the amount of light emitted is determined based on the above amount of reflected light and the control aperture value (S340), and then the process returns to the main routine. In this way, flash light amount control may be performed when focus detection is impossible by performing preliminary light emission.

Figure 22:
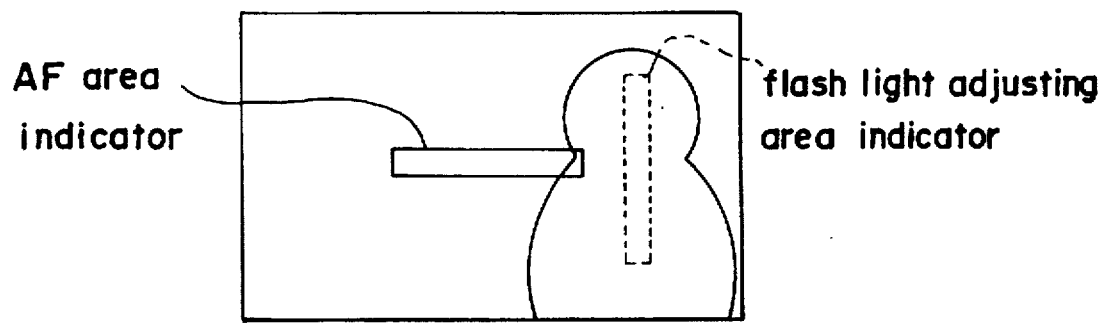
FIG. 22 is a diagram showing the indicator that displays the flash control area.
Figure 23:
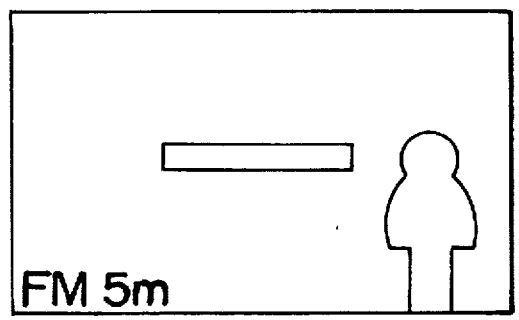
FIG. 23 is a diagram showing the indicator that displays the flash control status.
Figure 24:
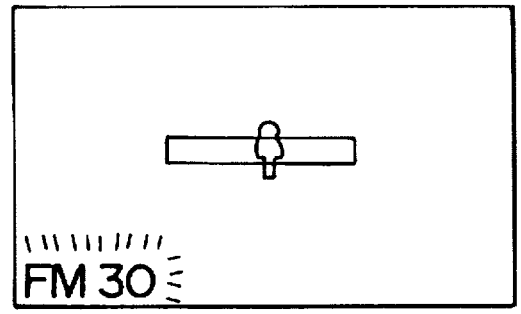
FIG. 24 is a diagram showing the indicator that displays the flash control status.
Figure 25:
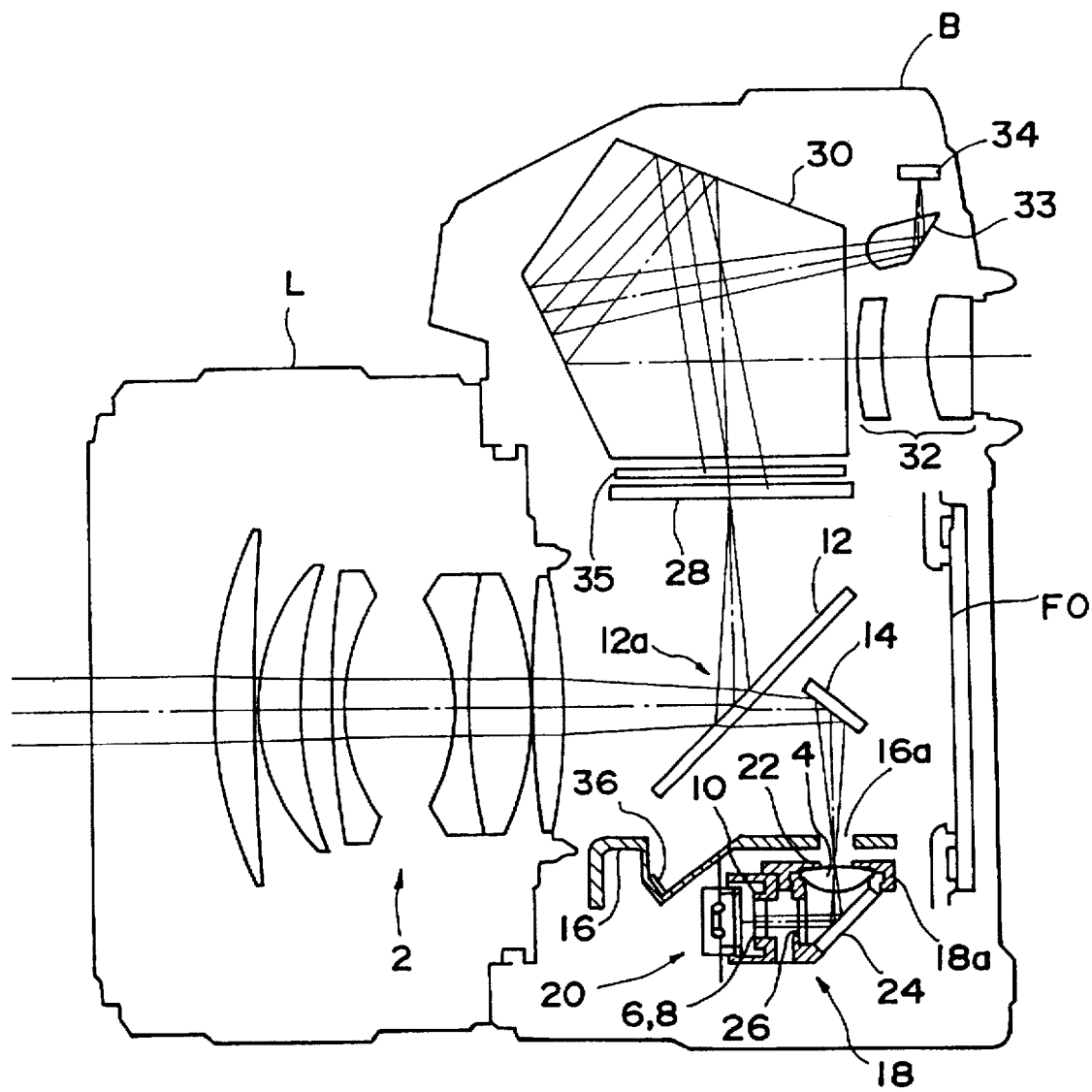
FIG. 25 is an outline construction diagram showing a camera equipped with a conventional flash light amount controlling apparatus.
Figure 26:
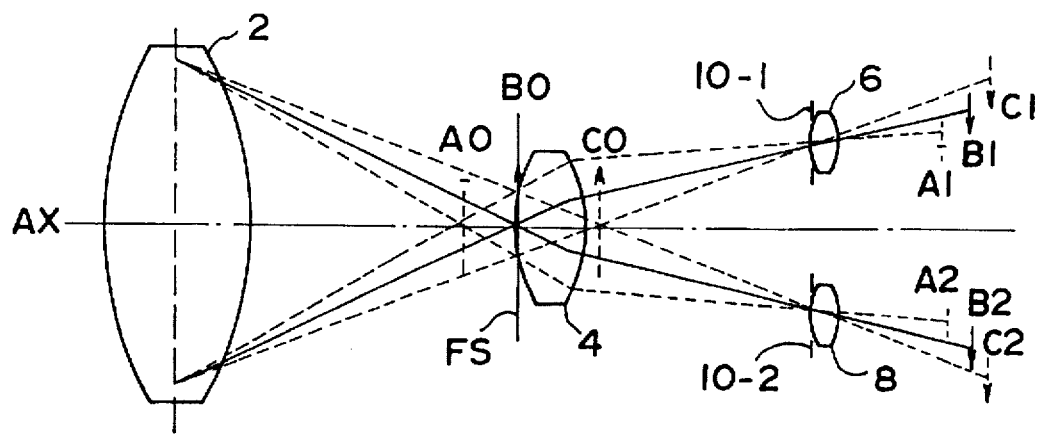
FIG. 26 is a drawing showing an optical system for performing focus detection using the phase differential method.
Figure 27:
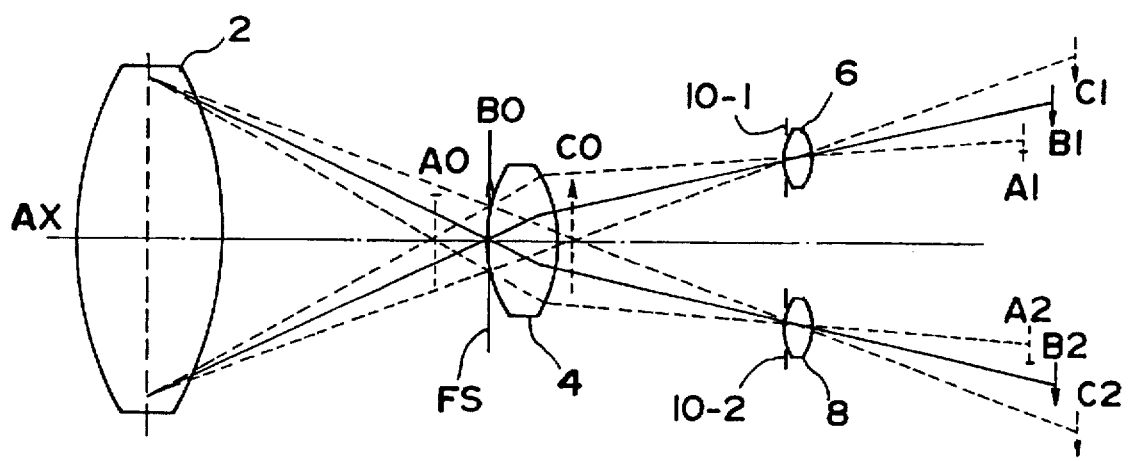
FIG. 27 is a drawing showing an optical system for performing focus detection using the phase differential method.

Next, the relationship between flash light amount control and the display device inside the camera body is explained. Where flash light control is performed by the monitor element for the area selected by controller 40, that selected area is displayed as shown in FIG. 22. The drawing covers the case in which the flash light amount control area and the focus adjustment area are different, due to panning, etc. Of course, the indicator showing the area as to which focus adjustment was performed may be used for the indication of the area as to which flash light amount control was performed. In addition, where flash light amount control based on the object distance is performed, this is displayed by the display device (in the drawing, 'FM' indicating that flashmatic is active is shown), as is the current object distance, as shown in FIG. 23.

Where the object distance information is not reliable, this fact may be conveyed to the photo-taker by blinking the display, as shown in FIG. 24. In order to display this during preliminary light emission, the indicator showing the focus adjustment area should not be displayed.

As explained above, by locating light amount control sensors outside the focus detection areas, the appropriate beams of light may be led to their respective photoreceptor areas. Moreover, if the light amount control sensors are located inside the focus detection areas, space may be more efficiently utilized, the size of the sensor chips may be reduced, and the use of the sensors for multiple purposes will lead to lower costs.

In addition, by locating light amount detection sensors in the optical system inside the AF module, the built-in module optical system may be simplified.

Furthermore, because the method of flash light amount control alternates in response to the AF mode setting or the camera panning status or the reliability of the detected object distance, correct flash light amount control may be performed with respect to the object to be photographed under various conditions.

Obviously, many modifications and variation of the present invention are possible in light of the above teachings. It is therefore to be understood that within the scope of the appended claims, the invention may be practiced other than as specifically described.

What is claimed is:

1. Flash light amount controlling apparatus, comprising:

a distinction device which distinguishes set auto focus mode; and a control device, having first and second flash light amount control devices, which selectively controls either the first or the second flash light amount control device as a function of the auto focus mode distinguished by said distinction device whereby said flash light amount controlled by said control device is based on reflected flash light.

2. Flash light amount controlling apparatus as claimed in claim 1, wherein said first flash light amount control device performs flash light adjustment, wherein said second flash light amount control device performs flashmatic.

3. Flash light amount controlling apparatus as claimed in claim 1, further comprising a focus detection device which detects focusing condition of the object, and wherein said distinction device distinguishes at least continuous mode and focus lock mode; and said control device performs flash light adjustment in the continuous mode and performs flashmatic in the focus lock mode.

4. A camera, comprising:

autofocus means for performing autofocusing on an object to be photographed;

set means for setting an AF lock;

detection means for detecting a distance to the object;

a flash apparatus;

a photometric element for outputting luminescence signals corresponding to flash light amount of said flash apparatus during exposure;

first flash control means for controlling said flash apparatus based on the distance detected by said detection means;

second flash control means for controlling said flash apparatus based on luminescence signals outputted by said photometric element; and select means for selecting said first flash control means using the detected distance when the AF lock is on, and for selecting said second flash control means based on luminescence signals when the AF lock is not on.

5. A camera as claimed in claim 4, wherein said first flash control means controls using the distance prior to AF lock.

6. A camera as claimed in claim 4, further comprising determination means for determining a reliability of the distance detected by said detection means, wherein said first flash control means controls using a farthest distance within an error range where the distance is not reliable.

7. A camera as claimed in claim 4, further comprising a second detection means for detecting whether or not a panning operation is performed when AF lock is on, wherein said select means selects the second flash control means when a panning operation is not detected by said second detection means.

* * * * *

UNITED STATES PATENT AND TRADEMARK OFFICE
CERTIFICATE OF CORRECTION

PATENT NO. : 5,752,101
DATED : May 12, 1998
INVENTOR(S) : Norihiko AKAMATSU et al It is certified that error appears in the above-identified patent and that said Letters Patent is hereby corrected as shown below:

Column 1, line 36, delete "a" and insert --an--.

Column 16, claim 1, line 28, delete "having first" and insert --having a first--.

Column 16, claim 1, lines 29-30, delete "devices, which selectively controls either" and insert --device, which selects--.

Column 16, claim 1, line 31, delete "as a function of" and insert --based on--.

Column 16, claim 1, lines 32-34, delete "device whereby said flash light amount controlled by said control device is based on reflected flash light." and insert --device.--.

Column 16, claim 2, line 37, delete "adjustment, wherein" and insert --adjustment, and wherein--.

Column 16, claim 3, line 41, delete "detects focusing condition of the object, and wherein" and insert --detects a focusing condition of an object, and wherein:--.

Column 16, claim 4, lines 54-55, delete "outputting luminescence signals corresponding to flash" and insert --outputting signals corresponding to a flash--".

UNITED STATES PATENT AND TRADEMARK OFFICE
CERTIFICATE OF CORRECTION

PATENT NO. : 5,752,101
DATED : May 12, 1998
INVENTOR(S) : Norihiko AKAMATSU et al It is certified that error appears in the above-identified patent and that said Letters Patent is hereby corrected as shown below:

Column 16, claim 4, line 62, delete "on luminescence signals" and insert --on signals--.

Column 16, claim 4, line 65, delete "using the detected distance when the AF lock is on, and" and insert --when the AF lock is on, and--.

Column 16, claim 4, lines 66-67, delete "means based on luminescence signals when the AF lock is not on." and insert --means when the AF lock is not on--.

Column 17, claim 5, line 2, delete "controls using" and insert --controls said flash apparatus using--.

Column 17, claim 6, line 6, delete "controls using" and insert --controls said flash apparatus using--.

UNITED STATES PATENT AND TRADEMARK OFFICE
CERTIFICATE OF CORRECTION

PATENT NO. : 5,752,101
DATED : May 12, 1998
INVENTOR(S) : Norihiko AKAMATSU et al It is certified that error appears in the above-identified patent and that said Letters Patent is hereby corrected as shown below:

Column 18, claim 7, line 3, delete "on, wherein" and insert --on, and wherein--.

Column 18, claim 7, line 4, delete "selects the second" and insert --selects said second--".

Signed and Sealed this

Eighth Day of June, 1999

Attest:

Attesting Officer

Q. TODD DICKINSON

Acting Commissioner of Patents and Trademarks